(12) United States Patent
Jain et al.

(10) Patent No.: US 9,736,046 B1
(45) Date of Patent: Aug. 15, 2017

(54) PATH ANALYTICS USING CODEBOOK CORRELATION

(71) Applicant: EMC IP Holding Company LLC, Hopkinton, MA (US)

(72) Inventors: Manoj Kumar Jain, Karnataka (IN); Girish Narayana Rao Nadger, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 312 days.

(21) Appl. No.: 13/905,486

(22) Filed: May 30, 2013

(51) Int. Cl.
*H04L 12/28* (2006.01)
*H04L 12/26* (2006.01)

(52) U.S. Cl.
CPC .................... *H04L 43/0823* (2013.01)

(58) Field of Classification Search
CPC ............. H04L 41/0631; H04L 41/0677; H04L 41/0226; H04L 41/024; H04L 41/06; H04L 41/12; H04L 43/00; H04L 43/0811; H04L 43/0829; H04L 43/0852; H04L 43/087; H04L 43/0882; H04L 43/16; H04L 12/2602; H04L 41/147; H04L 43/04; H04L 12/2652; G06F 11/079; G06F 11/3485; G06F 3/0689
USPC ................ 370/252, 231, 238, 241; 702/185; 703/22; 709/224
See application file for complete search history.

(56) References Cited

U.S. PATENT DOCUMENTS

| | | | |
|---|---|---|---|
| 5,528,516 | A | 6/1996 | Yemini et al. |
| 5,742,792 | A | 4/1998 | Yanai et al. |
| 6,434,637 | B1 | 8/2002 | D'Errico |
| 6,622,221 | B1 | 9/2003 | Zahavi |
| 6,965,845 | B2 | 11/2005 | Ohsie et al. |
| 7,003,433 | B2 | 2/2006 | Yemini et al. |
| 7,054,883 | B2 | 5/2006 | Meiri et al. |

(Continued)

OTHER PUBLICATIONS

U.S. Appl. No. 12/932,080, filed Feb. 17, 2011, Meiri et al.

(Continued)

*Primary Examiner* — Shaq Taha
*Assistant Examiner* — Lionel Preval
(74) *Attorney, Agent, or Firm* — Muirhead and Saturnelli, LLC

(57) ABSTRACT

A system and method are provided to model a network path with performance characterization for individual path segments of the network path and correlate the faults and performance issues to identify the factors that are causing network path performance degradation. The system described herein provides for codebook correlation technology to identify the root cause of network path performance degradation. In an embodiment, an algorithm is provided to model the network path with performance characterization and analysis. The performance of a network path is determined by performance characteristics of individual hops along the network path. The path performance is then characterized with weighted attributes indicative of performance over individual hops along the network path. The individual hops along the network path are modeled with weighted attributes indicative of performance. The performance symptoms may be aggregated to determine path performance using codebook correlation to perform a causal analysis.

20 Claims, 17 Drawing Sheets

(56) References Cited

U.S. PATENT DOCUMENTS

| | | |
|---|---|---|
| 7,266,706 B2 | 9/2007 | Brown et al. |
| 7,292,969 B1 | 11/2007 | Aharoni et al. |
| 7,392,360 B1 | 6/2008 | Aharoni et al. |
| 7,475,207 B2 | 1/2009 | Bromling et al. |
| 7,529,181 B2 | 5/2009 | Yardeni et al. |
| 7,577,722 B1 | 8/2009 | Khandekar et al. |
| 7,688,753 B1 | 3/2010 | Zimran et al. |
| 7,779,291 B2 | 8/2010 | Yoder et al. |
| 7,783,778 B2 | 8/2010 | Benjamin |
| 7,975,018 B2 | 7/2011 | Unrau et al. |
| 8,028,062 B1 | 9/2011 | Wigmore et al. |
| 8,433,848 B1 | 4/2013 | Naamad et al. |
| 2004/0249610 A1* | 12/2004 | Ohsie et al. .................. 702/185 |
| 2005/0021742 A1* | 1/2005 | Yemini .................. G06Q 10/04 709/224 |
| 2005/0210133 A1* | 9/2005 | Florissi ............... G06F 11/3006 709/224 |
| 2006/0182034 A1* | 8/2006 | Klinker et al. ............... 370/238 |
| 2006/0215564 A1* | 9/2006 | Breitgand ........... H04L 41/0631 370/241 |
| 2008/0025223 A1* | 1/2008 | Karacali-Akyamac ............ H04L 12/2602 370/241 |
| 2008/0080376 A1* | 4/2008 | Adhikari et al. ............. 370/231 |
| 2008/0319731 A1* | 12/2008 | Chambliss ............ H04L 41/024 703/22 |

OTHER PUBLICATIONS

U.S. Appl. No. 13/136,359, filed Jul. 29, 2011, Van der Goot.
U.S. Appl. No. 13/335,316, filed Dec. 22, 2011, Lim et al.
U.S. Appl. No. 13/561,340, filed Jul. 30, 2012, Jain et al.
EMC Corporation, "EMC Ionix ControlCenter (formerly EMC ControlCenter) 6.0 StorageScope: Best Practices Planning," White Paper H4154, Jun. 2009, 43 pp.
EMC Corporation, "ProSphere Discovery and Monitoring for the Modern Data Center," White Paper H8890, Aug. 2011, 17 pp.
VCE Company, "Automated Monitoring and Event Recovery of Vblock™ Infrastructure Platforms with IPSoft Managed Service," White Paper, May 2011, 20 pp.
EMC Corporation, "Automating Root-Cause Analysis: EMC Ionix Codebook Correlation Technology vs. Rules-based Analysis: Technology Concepts and Business Considerations," White paper h5964, Nov. 2009, 12 pp.

* cited by examiner

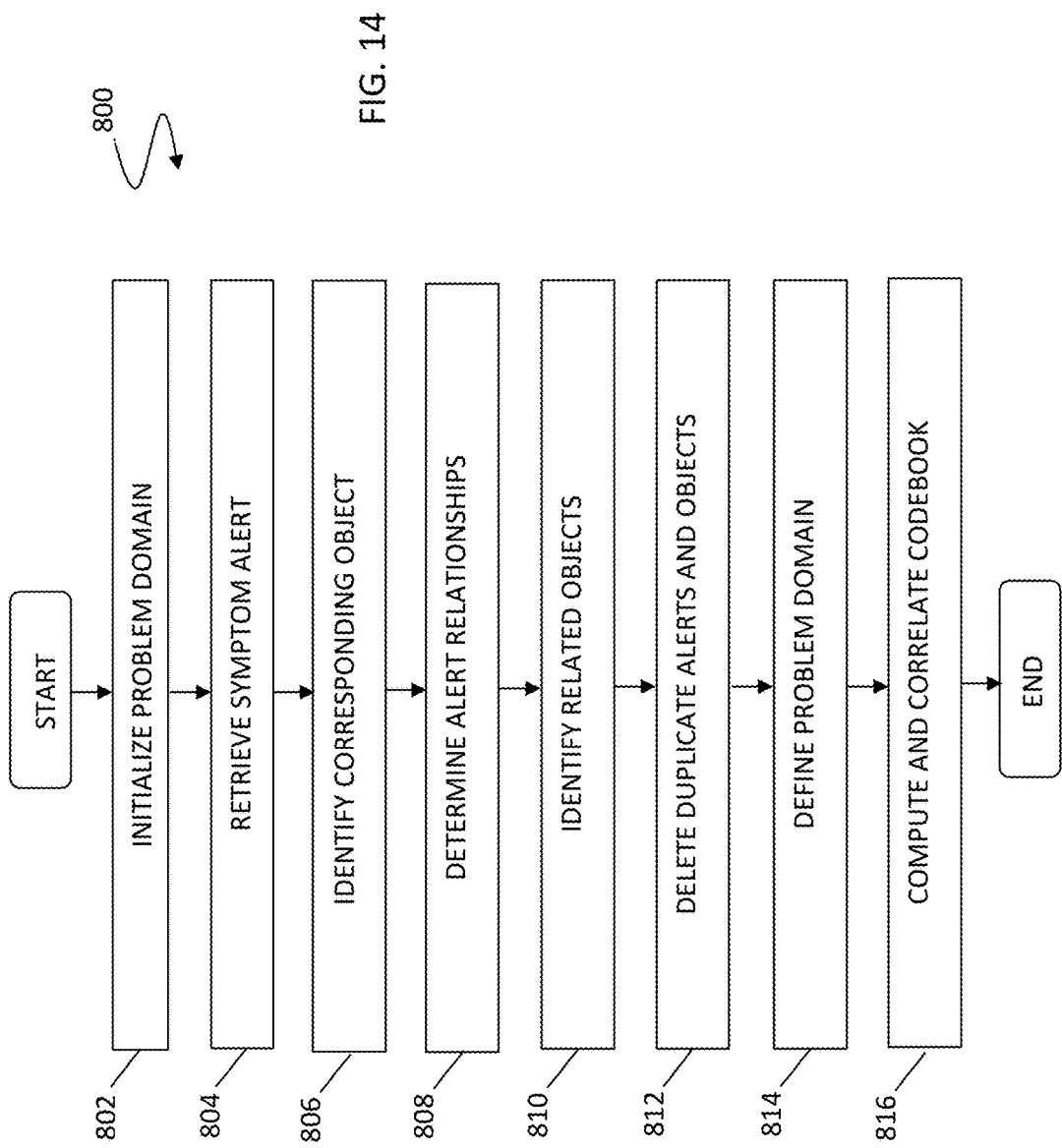

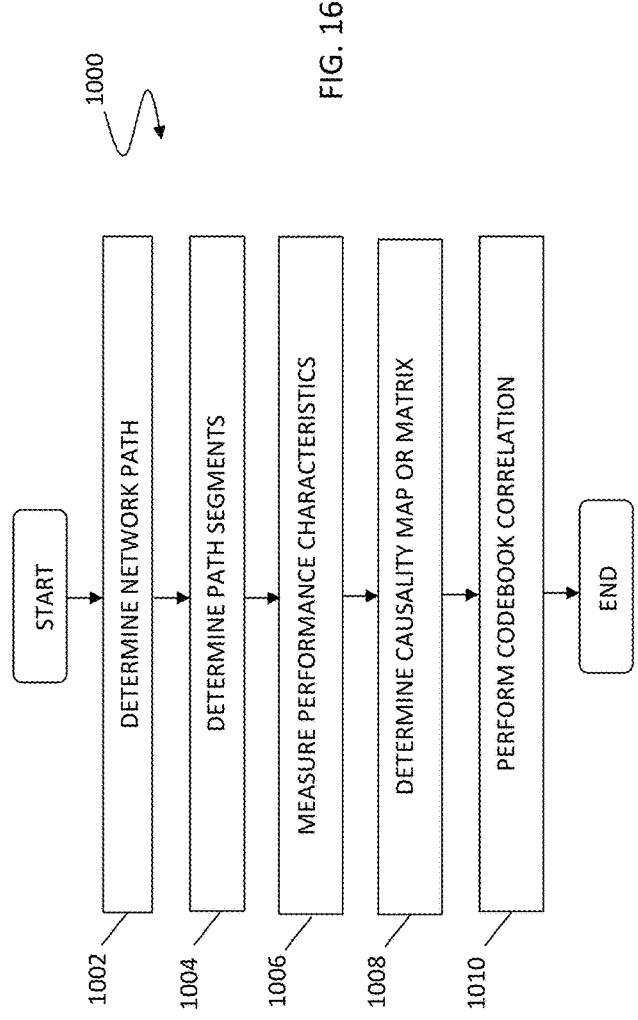

PATH ANALYTICS USING CODEBOOK CORRELATION

TECHNICAL FIELD

This application relates to management of a distributed system in virtualized environment.

BACKGROUND OF THE INVENTION

Host processor systems may store and retrieve data using storage devices (also referred to as storage arrays) containing a plurality of host interface units (host adapters), disk drives, and disk interface units (disk adapters). Such storage devices are provided, for example, by EMC Corporation of Hopkinton, Mass. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives. The hosts, storage devices and/or other elements, such as switches and/or array components, may be provided as part of a storage area network (SAN).

Operating characteristics of the storage devices and/or other elements of the SAN may be monitored according to different performance statistics and measures. Operating characteristics may include, for example, performance data, capacity data, and/or discovery data, including configuration data and/or topology data, among other characteristics. As an example, operating characteristics of input/output (I/O) data paths among storage devices and components may be measured and may include I/O operations (e.g., measured in I/Os per second and Mbs per second) initiated by a host that will result in corresponding activity in SAN fabric links, storage array ports and adapters, and storage volumes. Such characteristics may be significant factors in managing storage system performance, for example, in analyzing use of lowering access performance versus more expensive higher performance disk drives in a SAN, or by expanding number of SAN channels or channel capacity. Users may balance performance, capacity and costs when considering how and whether to replace and/or modify one or more storage devices or components. Other characteristics may similarly be measured, including characteristics for types of distributed systems other than storage systems.

Known techniques and systems for performing root cause and impact analysis of events occurring in a system may provide automated processes for correlating the events with their root causes. Such automation techniques address issues of an outage causing a flood of alarms in a complex distributed system comprised of many (e.g., thousands) of interconnected devices. Reference is made, for example, to: U.S. Pat. No. 7,529,181 to Yardeni et al., entitled "Method and Apparatus for Adaptive Monitoring and Management of Distributed Systems," that discloses a system for providing adaptive monitoring of detected events in a distributed system; U.S. Pat. No. 7,003,433 to Yemini et al., entitled "Apparatus and Method for Event Correlation and Problem Reporting," that discloses a system for determining the source of a problem in a complex system of managed components based upon symptoms; U.S. Pat. No. 6,965,845 to Ohsie et al., entitled "Method and Apparatus for System Management Using Codebook Correlation with Symptom Exclusion," that discloses a system for correlating events in a system and provides a mapping between each of a plurality of groups of possible symptoms and one of a plurality of likely problems in the system, and U.S. Pat. No. 5,528,516 to Yemini et al., entitled "Apparatus and Method for Event Correlation and Problem Reporting," that discloses a system for efficiently determining the source of problems in a complex system based on observable events, all of which are incorporated herein by reference. It is noted, however, that such known techniques and systems may, in some circumstances, involve the maintaining of a large hierarchical relationship structure of faults and alerts and that may cause undesirable performance bottlenecks and require increasingly complex computations as network topology increases that may result in system performance degradation.

Accordingly, it would be desirable to provide a system that may be advantageously and efficiently used to identify faults and determine alerts in a network or other system topology with improved specificity, particularly as the system topology grows in size and complexity.

SUMMARY OF THE INVENTION

According to the system described herein, a method for network path performance management includes determining start and end nodes of a network path. A plurality of path segments of the network path are determined. At least one path performance characteristic for the network path is determined and at least one segment performance characteristic for each of the plurality of path segments is determined. Causality information is determined based on the performance characteristics measured for the network path and each of the plurality of path segments. The causality information is correlated to identify at least one network path performance problem. The causality information may be correlated using a codebook. The network path performance problem may include at least one root cause of a performance symptom. The method may further include modifying the network path to include a different one of the plurality of path segments based on the identified at least one network path performance problem. The path performance characteristic may includes round trip time, packet loss percentage, jitter and/or class of service. The segment performance characteristic may include incoming packet rate, outgoing packet rate, percentage bandwidth utilization, error packet rate and/or drop packet rate. The method may further include displaying information corresponding to the identified at least one network path performance problem according to individual ones of the plurality of path segments.

According further to the system described herein, a non-transitory computer-readable medium stores software for network path performance management. The software includes executable code that determines start and end nodes of a network path. Executable code is provided that determines a plurality of path segments of the network path. Executable code is provided that measures at least one path performance characteristic for the network path and at least one segment performance characteristic for each of the plurality of path segments. Executable code is provided that determines causality information based on the performance characteristics measured for the network path and each of the plurality of path segments. Executable code is provided that correlates the causality information to identify at least one network path performance problem. The causality information may be correlated using a codebook. The network path performance problem may include at least one root cause of a performance symptom. Executable code may be provided that modifies the network path to include a different one of the plurality of path segments based on the identified at least one network path performance problem. The path performance characteristic may include round trip time, packet loss percentage, jitter and/or class of service. The segment performance characteristic may include incoming packet rate, outgoing packet rate, percentage bandwidth utilization, error packet rate and/or drop packet rate. Executable code may be provided that displays information corresponding to the identified at least one network path performance problem according to individual ones of the plurality of path segments.

According further to the system described herein, a system for managing network path performance includes a controller that identifies components of a network path. At least one processor executes software stored on a non-transitory computer-readable medium, the software including executable code that determines start and end nodes of a network path. Executable code is provided that determines a plurality of path segments of the network path. Executable code is provided that measures at least one path performance characteristic for the network path and at least one segment performance characteristic for each of the plurality of path segments. Executable code is provided that determines causality information based on the performance characteristics measured for the network path and each of the plurality of path segments. Executable code is provided that correlates the causality information to identify at least one network path performance problem. The causality information may be correlated using a codebook. The network path performance problem may include at least one root cause of a performance symptom. Executable code may be provided that modifies the network path to include a different one of the plurality of path segments based on the identified at least one network path performance problem. The path performance characteristic may include round trip time, packet loss percentage, jitter and/or class of service. The segment performance characteristic may include incoming packet rate, outgoing packet rate, percentage bandwidth utilization, error packet rate and/or drop packet rate. The system may include a display and executable code may be provided that displays information corresponding to the identified at least one network path performance problem according to individual ones of the plurality of path segments.

BRIEF DESCRIPTION OF THE DRAWINGS

Embodiments of the system are described with reference to the several figures of the drawings, which are briefly described as follows.

FIG. 14 is a flow diagram for processing of the problem domain computation module according to an embodiment of the system described herein.

FIG. 16 is a flow diagram showing processing for network path performance management using codebook correlation according to an embodiment of the system described herein.

DETAILED DESCRIPTION OF VARIOUS EMBODIMENTS

Figure 1:
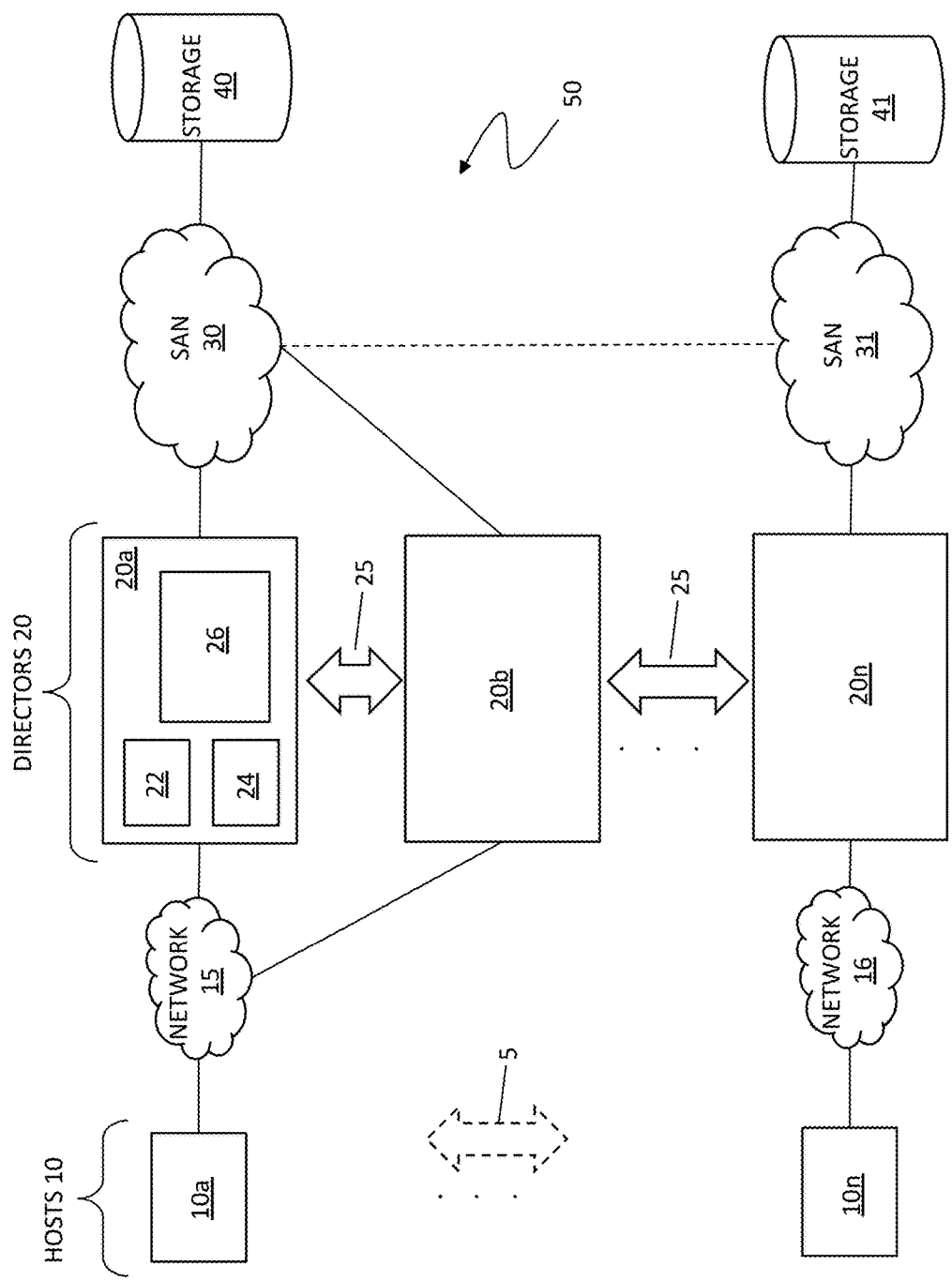
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 (10a to 10n) are communicably coupled with a plurality of directors 20 (20a, 20b to 20n). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "n" is used herein to indicate an indefinite plurality, so that the number "n" when referred to one component does not necessarily equal the number "n" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc.

The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16, and it is noted that the networks 15, 16 may be combined with, and/or incorporated with, one or more of the SANs 30, 31. Generally, a SAN may be used to couple one or directors and/or host devices with one or more storage devices in a manner that allows reconfiguring connections without having to physically disconnect and reconnect cables from and to ports of the devices. A SAN may be implemented using one or more switches to which the storage devices, directors and/or host devices are coupled. The switches may be programmed to allow connections between specific ports of devices coupled to the switches. A port that can initiate a data-path connection may be called an "initiator" port while the other port may be deemed a "target" port.

Several of the directors 20 may be clustered together at one or more sites and in which the sites are geographically distant from one another. The system described herein may be used in connection with a vSphere produced by VMware Inc. of Palo Alto, Calif. and/or a VPLEX product produced EMC Corporation of Hopkinton, Mass., respectively. The system described herein may also be used in connection with a storage array product produced by EMC Corporation, such as a Symmetrix product, and/or with a Vblock platform product produced by VCE Company, LLC. Although generally discussed and illustrated in connection with embodiment for a distributed storage system, the system described herein may generally be used in connection with any appropriate distributed processing or cloud computing system, as further discussed elsewhere herein.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. For example, a distributed cache manager may be run on one or more desktop computers and/or virtual machines with a network connection. For further discussion of managing shared disk array functions and distributed cache coherence mechanisms, reference is made, for example, to U.S. Pat. No. 7,266,706 to Brown et al., entitled "Methods and Systems for Implementing Shared Disk Array Management Functions," and U.S. Pat. No. 7,975,018 to Unrau et al., entitled "Systems and Methods for Providing Distributed Cache Coherence," which are incorporated herein by reference.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image is the state of the virtual machine as it resides in the host's memory. The VM image may be obtained for an operating VM and transferred to another location where the VM continues execution from the state defined by the virtual machine image. In this way, the VM image may be a snapshot of an execution state of a program by a VM that may be moved between different locations and processing thereafter continued without interruption.

In a virtualized environment, a virtual center, an example of which may be a vCenter product produced by VMware, Inc. of Palo Alto, Calif., may provide a central point of control for managing, monitoring, provisioning and migrating virtual machines. Data storage and management may be provided in connection with one or more data centers coupled by a network. Virtual centers may operate to control virtual machines in the data centers and, for example, in connection with cloud computing. A virtual center may further include a virtual data center (VDC) that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC. It is noted that where the term "Vblock" is used herein, it may also be generally understood as including and referring to any other appropriate software and/or component packages that provide network, compute and/or storage services for use in a virtualized computing environment. Management of a Vblock may be provided by an appropriate software element. For example, EMC's Ionix Unified Infrastructure Manager (UIM) may be integrated with Vblock and provide a management console for management of the Vblock package in accordance with operations and functionality further discussed in detail elsewhere herein.

Figure 2:
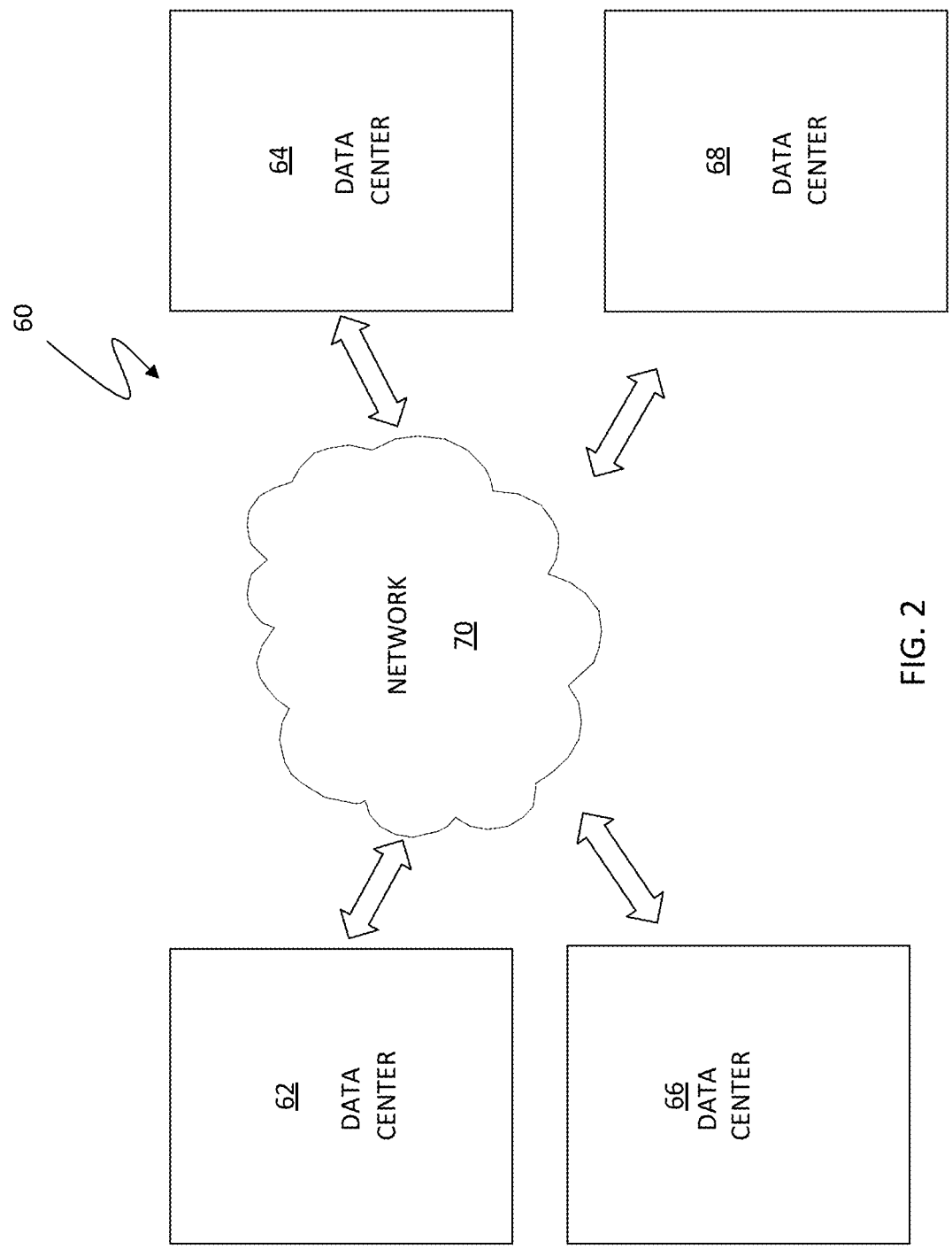
FIG. 2 is a schematic illustration showing a system that includes a plurality of data centers in communication via a network that may be used in accordance with an embodiment of the system described herein.

FIG. 2 is a schematic illustration showing a system 60 that includes a first data center 62 in communication with a second data center 64 via a network 70. Although embodiments are discussed principally in connection with two data centers 62, 64, any number of additional data centers, represented as data centers 66, 68, may be also be used in connection with the system described herein. Each of the data centers 62, 64, 66, 68 may include a plurality of devices and processors (see, e.g., FIG. 1) for executing applications using a plurality of VMs and which may be controlled and/or managed in connection with one or more virtual centers and/or VDCs. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 62, 64 may contain any number of processors and storage devices that are configured to provide the functionality described herein. The data centers 62, 64 may be configured similarly to each other or may be configured differently. The network 70 may be any network or similar mechanism allowing data communication between the data centers 62, 64. In an embodiment herein, the network 66 may be the Internet and/or any other appropriate network and each of the data centers 62, 64 may be coupled thereto using any appropriate mechanism. In other embodiments, the network 70 may represent a direct connection (e.g., a physical connection) between the data centers 62, 64.

In various embodiments, VMs may be migrated from a source one of the data centers 62, 64 to a destination one of the data centers 62, 64. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van der Goot, filed Jul. 29, 2011, entitled "Active/Active Storage and Virtual Machine Mobility Over Asynchronous Distances," which are incorporated herein by reference. A product, such as EMC's VPLEX Metro and/or VPLEX Geo, may be used to manage VMs and other storage resources. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that where the term "VPLEX" is used herein it may also generally be understood as including and referring any other appropriate software and/or component packages that provide for coordinating and/or federating resources of disparate systems as a single pool of virtual resources, in particular, for example, a single pool of virtual storage.

Figure 3:
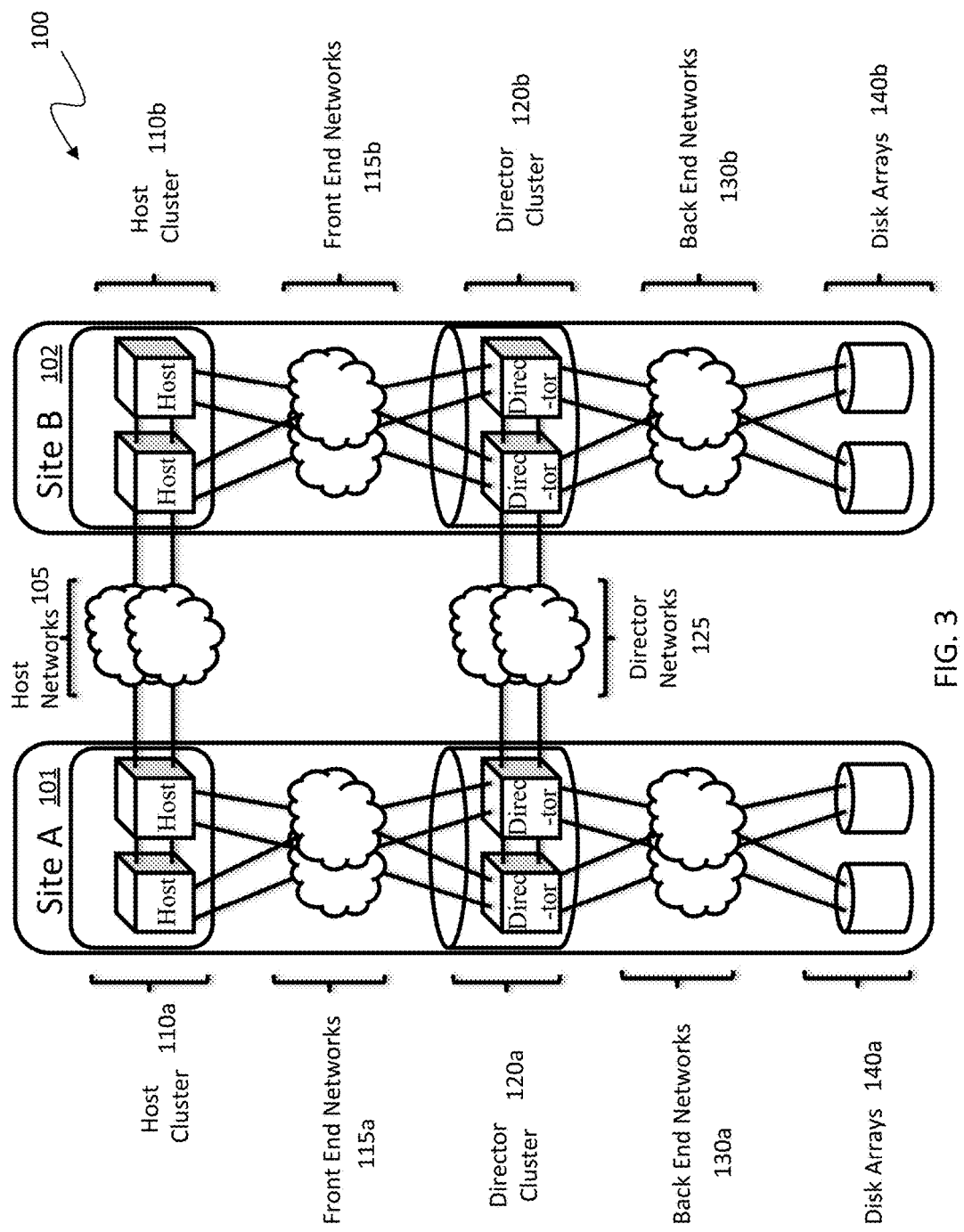
FIG. 3 is a schematic illustration showing a distributed storage system with multiple sites according to an embodiment of the system described herein.

FIG. 3 is a schematic illustration showing a distributed storage system 100 having multiple sites that may be used in connection with an embodiment of the system described herein. Although illustrated with two sites, Site A 101 and Site B 102, the system described herein may also operate in connection with additional sites. It is noted that components that are specifically discussed herein with respect to Site A 101 may be also be provided in Site B 102 (or any additional site), and vice versa where appropriate. The sites 101, 102 may include one or more hosts grouped in host clusters 110a,b, one or more directors grouped in director clusters 120a,b, and disk arrays 140a,b. Each host cluster 110a,b and director cluster 120a,b may each include software and/or other controllers or interfaces to control or administer operations in connection with described functions of the hosts and directors. In connection therewith, the components discussed herein in connection with the sites 101, 102 may, in various embodiments, be part of one or more data centers as further discussed elsewhere herein.

In an embodiment, each host cluster 110a,b may include hosts, such as ESX hosts, in a vSphere cluster and director cluster 120a,b may include directors in a VPLEX cluster. Front end networks 115a,b may connect through host links to the host clusters 110a,b and through front end links to the director clusters 120a,b. One or more back end networks 230a,b may connect through back end links to the director clusters 120a,b and through array links to the disk arrays 140a,b. In an embodiment, the front and back end networks may be Fibre Channel networks. The front end networks 115a,b allow the hosts (or VMs running therein) to perform I/O operations with the host clusters 110a,b, while the back end networks 130a,b allow the directors of the director clusters 120a,b to perform I/O on the disk arrays 140a,b. One or more host networks 105, such as vSphere Ethernet networks, connect the ESX hosts in host clusters 110a,b. One or more director networks 125 connect the directors of the director clusters 120a,b.

Various types of failures, including network failures within a cluster, may result in behaviors that are further discussed elsewhere herein. It should be noted that the host cluster 110a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A virtual machine file system (VMFS) may be created on top of these distributed volumes allowing VMs that migrate between the sites to see the same file system in either site. It is also noted that, as illustrated and according to various embodiments, each site 101, 102 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous distance. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the intercluster link on an as needed basis. In the background, the controller (VPLEX) may synchronize the oldest dirty data between the clusters.

The above operations may work as long as the inter-cluster network is available. If the inter-cluster link fails, both clusters may contain dirty data that is unknown by the respective remote clusters. As a consequence of this failure, the director cluster may rollback the image of the data to a write order consistent point. In other words, the director cluster may rollback the image of the data to a point where it knows the data that is available on both clusters, or to a time where the write data was exchanged between both sites. The director cluster may also guarantee rollback to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. For further discussion of maintaining write order consistency in storage system, references is made to U.S. Pat. No. 7,054,883 to Meiri et al., entitled "Virtual Ordered Writes for Multiple Storage Devices," and U.S. Pat. No. 7,475,207 to Bromling et al., entitled "Maintaining Write Order Fidelity on a Multi-Writer System," which are incorporated herein by reference.

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be referred to herein as "vMotion" and may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. patent application Ser. No. 13/136,359 to Van der Goot, as cited elsewhere herein.

Figure 4:
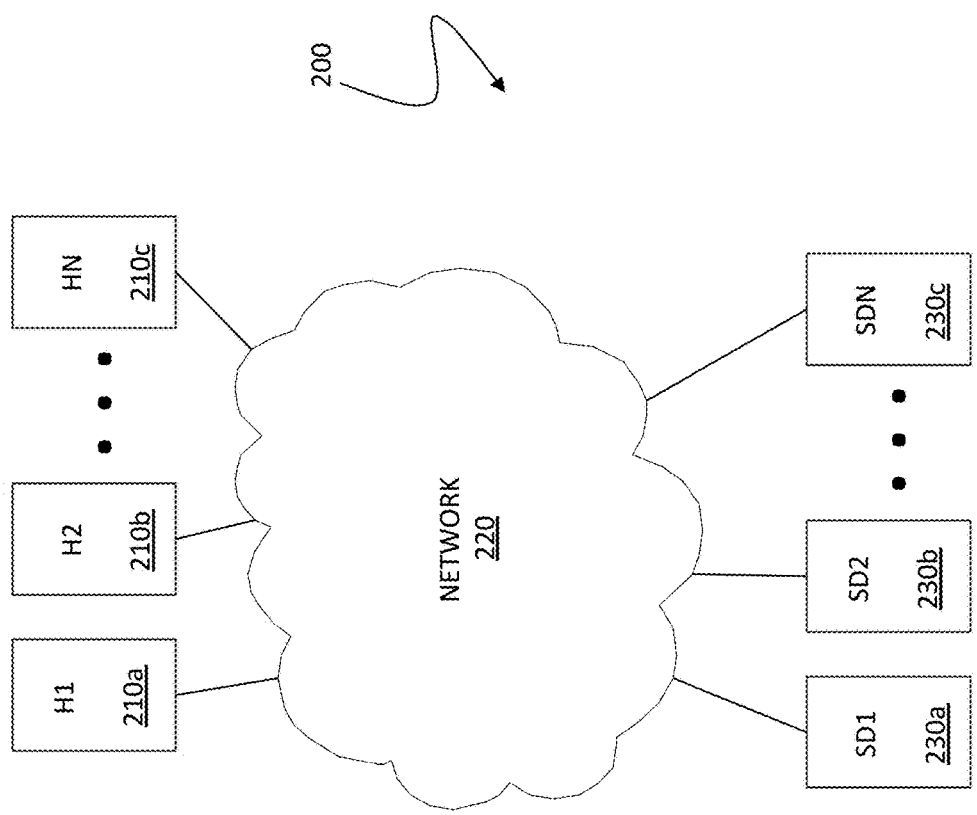
FIG. 4 is a schematic illustration showing a plurality of hosts coupled to a plurality of storage devices via a network according to an embodiment of the system described herein.

FIG. 4 is a schematic illustration 200 showing a network 220 that may include one or more of the networks, e.g. SANs, and provide a fabric coupling a plurality of host devices (H1-HN) 210a-c to a plurality of storage devices (SD1-SDN) 230a-c, as further discussed elsewhere herein. Each of the devices 210a-c, 230a-c may have a corresponding port that is physically coupled to switches of the SAN fabric used to implement the storage area network 220. The switches may be separately programmed by one of the devices 210a-c, 230a-c or by a different device (not shown). Programming the switches may include setting up specific zones that describe allowable data-path connections (which ports may form a data-path connection) and possible allowable initiator ports of those configurations. For example, there may be a zone for connecting the port of the host 210a with the port of the storage device 230a. Upon becoming activated (e.g., powering up), the host 210a and the storage device 230a may send appropriate signals to the switch(es) of the storage area network 220, and each other, which then allows the host 210a to initiate a data-path connection between the port of the host 210a and the port of the storage device 230a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Remote Data Facility products from EMC Corporation. For further discussion of Remote Data Facility systems and the use thereof in data recovery and storage techniques, see, for example, U.S. Pat. No. 5,742,792 to Yanai, et al., entitled "Remote Data Mirroring" and U.S. Pat. No. 7,779,291 to Yoder et al., entitled "Four Site Triangular Asynchronous Replication," which are incorporated herein by reference.

Techniques involving the configuration and use of storage area networks, including virtual storage area networks, are described, for example, in U.S. Pat. No. 8,028,062 to Wigmore et al., entitled "Non-Disruptive Data Mobility Using Virtual Storage Area Networks With Split Path Virtualization," which is incorporated herein by reference, that discloses techniques for the creation of a SAN centric storage virtualization layer that allows data mobility and migration without disruption to one or more hosts servers attached to the SAN. Reference is also made, for example, to U.S. Pat. No. 7,783,778 to Benjamin, entitled "Model-Based Method and Apparatus for Determining Virtual Private Network Topologies," which is incorporated herein by reference, and which discloses techniques for discovering and identifying network properties and topologies in a network represented by a model.

Figure 5:
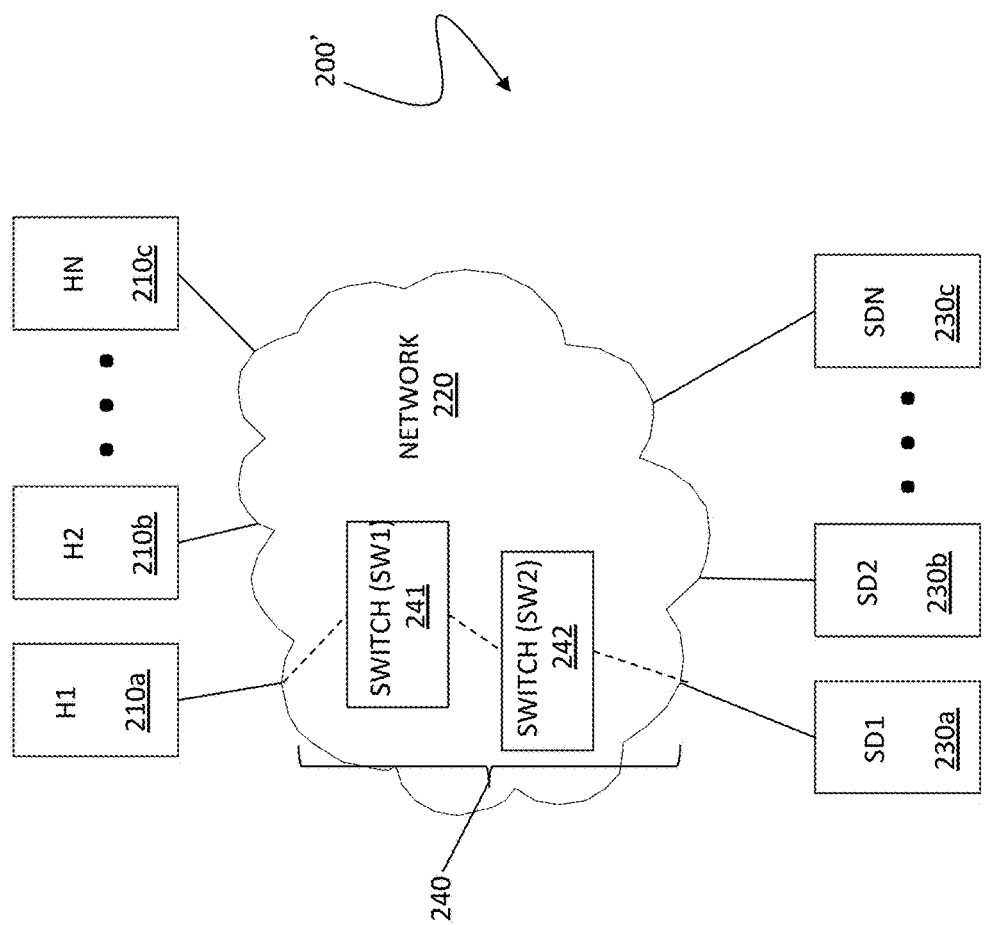
FIG. 5 is a schematic illustration of an embodiment of the network shown in FIG. 4 including multiple switches providing an I/O path between a host and a storage device in connection with an embodiment of the system described herein.

FIG. 5 is a schematic illustration 200' showing multiple SAN switches of a network 220, like that of FIG. 4, that may be used in connection with an embodiment of the system described herein. In the illustrated embodiment, the network 220 is shown with two switches, switch 241 (SW1) and switch 242 (SW2), that are used in connection with an I/O data path 240 from the host 210a to the storage device 230a. In various embodiments, the switches 241, 242 may include physical and/or logical devices. Although two switches are shown, more than two switches and/or other appropriate elements of a network fabric, including other types network elements and/or one or more compute elements, may be used in connection with the providing of I/O data paths from one or more of the hosts 210a-c to one or more of the storages devices 230a-c in connection with path performance data collection according to the system described herein.

The selection and/or identification of the I/O path 240 may be performed according to multiple selection factors and using known path selection techniques. Reference is made, for example, to U.S. Pat. No. 7,688,753 to Zimran et al., entitled "Selection of a Data Path Based on One or More Performance Characteristics of a Computer System," which is incorporated herein by reference and which discloses techniques for data path selection based on performance characteristics of a computer system using a path selection module. Reference is also made to U.S. Pat. No. 6,434,637 to D'Errico, entitled "Method and Apparatus for Balancing Workloads Among Paths in a Multi-Path Computer System Based on the State of Previous I/O Operations," which is incorporated herein by reference and which discloses techniques for selecting one of at least two I/O data paths for transmission of the next I/O operation based upon a state of previously assigned I/O operations queued for transmission over the I/O paths.

It is further noted that the system described herein may be used in connection with simulation of data storage systems for evaluation purposes. For example, I/O data paths of simulated storage system configurations may be evaluated to determine preferred configurations and/or identify potential problems of a possible I/O data path and elements thereof. Suitable data storage system simulation tools that may be used in connection with the system described herein may include systems and methods like that disclosed in U.S. Pat. No. 7,392,360 to Aharoni et al., entitled "Method and System for Capacity Planning and Configuring One or More Data Storage Systems," U.S. Pat. No. 7,292,969 to Aharoni et al., entitled "Method and System for Simulating Performance on One or More Storage Systems," and U.S. Pat. No. 8,433,848 to Naamad et al., entitled "Analysis Tool for a Multi-tier Storage Environment," which are all incorporated herein by reference.

Figure 6:
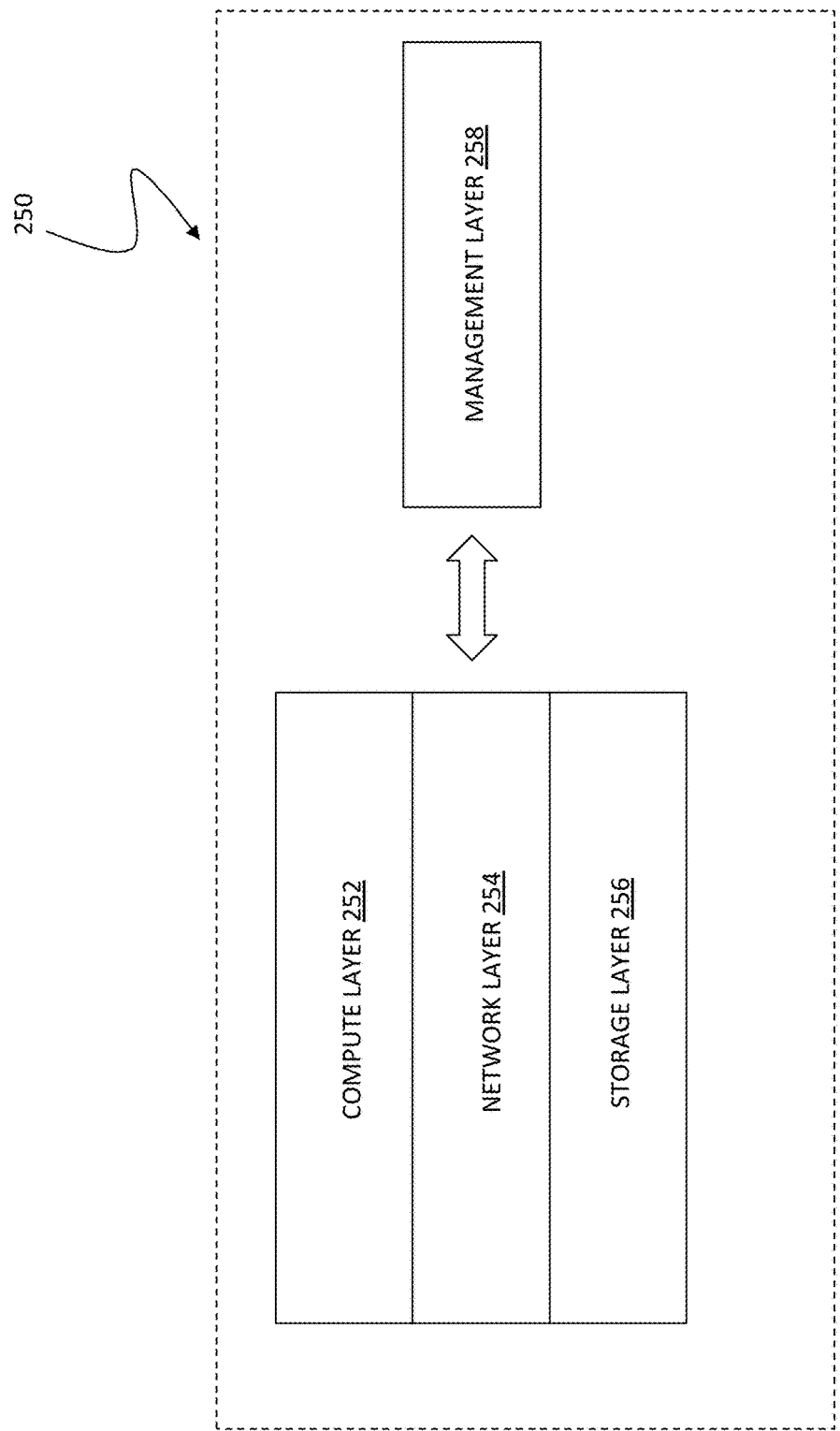
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute and storage layers 252, 256 within systems and/or between multiple cloud computing systems and to the client or customer network. The management layer 258 may provide one or more components used to manage one or more of the layers 252, 254 and/or 256. In an embodiment, the management layer 258 may include EMC Corporation's Ionix Unified Infrastructure Manager (UIM), as further discussed elsewhere herein.

Figure 7:
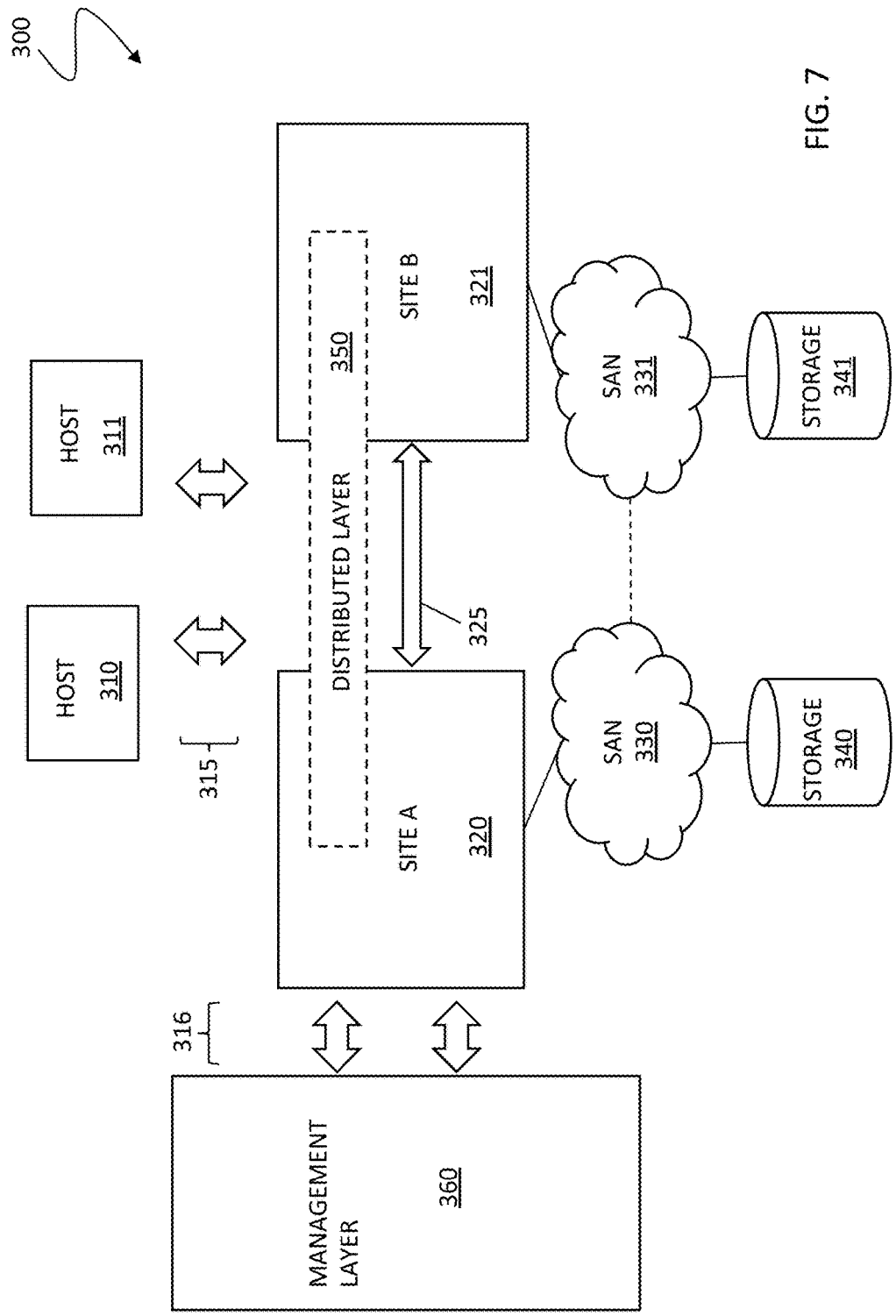
FIG. 7 is a schematic illustration showing a more detailed view of a distributed processing system that may be used in connection with an embodiment of the system described herein.

FIG. 7 is a schematic illustration showing a more detailed view of a distributed processing system 300 that may be used in connection with an embodiment of the system described herein. The system may include a collection of multiple compute sites, such as site A 320 and site B 321, that may each include one or more directors (access nodes) like the directors 20 discussed elsewhere herein. Although two compute sites are shown, more than two compute sites may be used and operated in connection with the system described herein. As further discussed elsewhere herein, the sites 320, 321 may be located geographically distant from each other. The sites 320, 321 may be connected via an interconnection 325, such as an IP network, PCI bus, FC network and/or any other type of network. Hosts 310, 311 are shown that may communicate with the compute sites 320, 321, as further discussed elsewhere herein. The hosts 310, 311 may be representative of any number of hosts that may perform I/O access operations in the distributed processing system 400.

The multiple compute sites 320, 321 may together be engaged in a joint operations in connection with I/O requests of one or more hosts, such as the host 310. The joint operations may provide for managing access to the data in connection with searching operations in accordance with the system described herein and/or other appropriate distributed processing operations. The sites 320, 321 may be coupled via SANs 330, 331 to storage resources 340, 341. The storage resources 340, 341 may be located in proximity to the sites 320, 321 and/or may be remotely located and accessed. In an embodiment, the SANs 330, 331 may be separate networks. Alternatively, in another embodiment, the SANs 330, 331 may be part of the same network, an embodiment shown represented by a dashed line connecting the SANs 330, 331. In various embodiments, the joint operations may include multiple, independent sub-computations and may include operations of a clustered small computer system interface (SCSI) device corresponding to use of external storage nodes that may be accessed by one or more of the sites 320, 321.

A distributed layer 350 is shown schematically as a system of the sites 320, 321 that may be distributed across the sites 320, 321 in connection with processing of one or more access nodes. The distributed layer 350 may function like a virtual center that provides for control of managing, monitoring, provisioning and migrating virtual machines. The distributed layer 350 may provide for managing deployment of virtual machines at one or more data centers, like the sites 320, 321, and may operate to control virtual machines at the sites 320, 321 in connection with cloud computing including both internal and external cloud infrastructures and hybrids thereof. The system described herein may operate in connection with a VPLEX product produced by EMC Corporation of Hopkinton, Mass. and/or a vSphere product produced by VMware Inc. of Palo Alto, Calif., as further discussed elsewhere herein.

According to the system described herein, a management (or orchestration) layer 360 may be provided that provides policy driven management for controlling access in connection with servicing I/O requests among the sites 320, 321 in a cloud computing federated environment. I/O requests from the hosts 310, 311 may be received by one or more of the sites 320, 321 over a communication link 315 that may be a network, such as the Internet and/or other suitable communication link. The management layer 360 may be coupled to the sites 320, 321, including the distributed layer 350, via a communication link 316 that may be the same as or a different network than the communication link 315. The management layer 360 may control and implement policies and/or other information for the servicing I/O requests at one or more of the sites 320, 321, as further discussed elsewhere herein. In various embodiments, the management layer 360 may be a software layer that is distributed across the sites 320, 321 like the distributed layer 350 and/or may be integrated in connection with an independent compute entity coupled to the sites 320, 321. The management layer 360 orchestrates, based, for example, on policies and/or other information fed from manual and dynamic inputs, where compute and storage processes may reside and provides non-disruptive control for the servicing of I/O requests that is fully enabled by a dynamic active/active storage platform.

Figure 8:
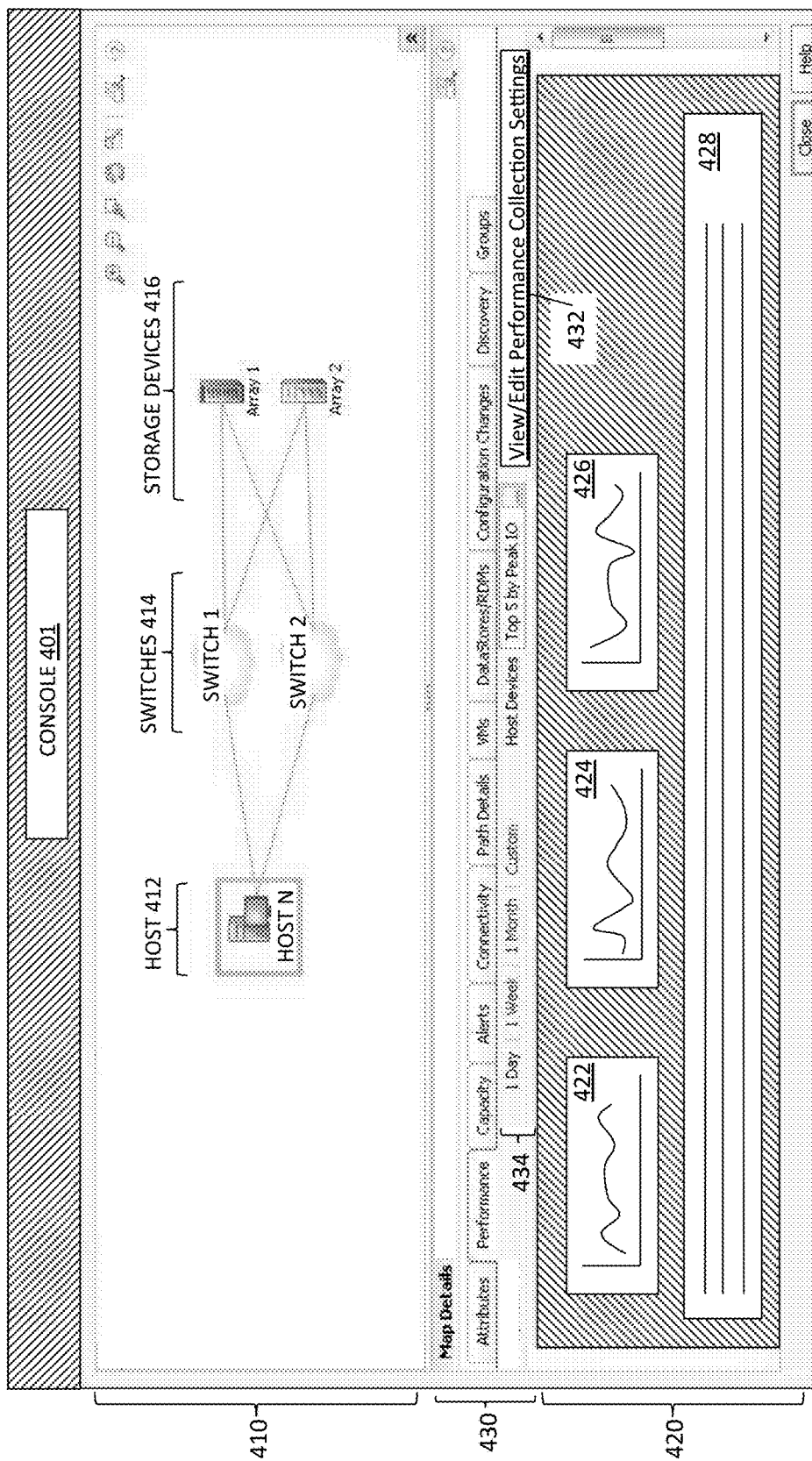
FIG. 8 is a schematic illustration showing a controller according to an embodiment of the system described herein that may include an interface component or console that enables feature control and display.

FIG. 8 is a schematic illustration showing a controller 400 according to an embodiment of the system described herein that may include a console 401 that enables feature control and display. The controller 400 may provide for user interface control and/or display of aspects of the network and components thereof, including performance characteristics and alert relationship analyses, according to various embodiments of the system described herein. As discussed in detail elsewhere herein, the controller 400 may enable determinations of alert relationships, including "on-the-fly" (or "just in time") determinations, for alerts affecting multiple causes, symptoms and impacts, and including on-the-fly determinations of root causes. In various embodiments, the alerts may include those for computing, network and/or storage components. The on-the-fly determinations of the controller 400 provide that the alert relationships may be determined in response to a query or request by the user without requiring the maintaining of a large stored hierarchical relationship structure of alerts.

In the illustrated example, the console 401 of the controller 400 is shown displaying a SAN and/or other appropriate network topology corresponding to one or more I/O data paths for a HOST N of the network. The console 401 may include a RESTful (representational state transfer) interface accessible via the Internet. The console 401 may include a graphical section 410 that shows a visual topology representation of the network and components thereof. For example, the section 410 graphical displays the host 412 (HOST N), coupled via switches 414, to one or more storage devices/arrays 416. Section 420 may display map details of the network elements, for example, performance measures for particular elements of I/O data paths in graph form 422, 424, 426 as well as in text or tabulated form 428. The performance measures displayed may include those discussed elsewhere herein, including workload and performance characteristics such as CPU utilization, memory utilization for the host and IOps (I/O in Mb per sec), response time in ms, throughput in KBps, and queue length for host devices, switches, arrays etc., among other appropriate measures.

Section 430 indicates that multiple types of detail and performance measures may be displayed in various forms for the application host, including features corresponding to the I/O data path attributes, performance, capacity, alerts, connectivity, path details, virtual machine (VM) information, data stores, configuration changes, discovery details and group details. A link button 432 may be provided to view/edit performance collection settings. Additionally, according to an embodiment, portion 434 indicates that historical or past performance data collection may be maintained by the system. For example, a user may view past performance data collection from the prior day, prior week, prior month and/or any other customizable date range.

The controller 400 according to the system described herein may provide for analysis and display of alerts for root causes, symptoms and impacts via a single application control. In an embodiment, the controller 400 may be part of a data collection tool that may provide for collection various types of data concerning performance characteristics of the storage devices and/or other elements of the network, including I/O data paths, that may be monitored according to various statistics and measures. Performance characteristics may include, for example, performance data, capacity data, discovery data, including configuration data and/or topology data, among other characteristics. Examples of various performance characteristics may include CPU utilization, memory utilization for the host and IOps (I/O in Mb per sec), response time in ms, throughput in KBps, discovered hosts of an I/O data path, queue length for host devices, whether the hosts are virtual (e.g., running as guest operating system or a virtual machine (VM)) or not, the hosts' IP addresses, operating systems and versions thereof, whether the host is in a group or cluster, and/or other appropriate performance characteristics.

In various embodiments, the component 400 may be an application installed on an application host or other computer providing network administration and/or management functionality and/or may be installed on one or more of hosts coupled to the network. In an embodiment, the component 400 may be used in connection with one or more Ionix produced by EMC Corporation of Hopkinton, Mass. Other storage management products that may be used in connection with the system described herein may include, for example, EMC's ProSphere product and/or a Vblock platform product produced by VCE Company, LLC.

In an embodiment, the statistics used by the component 400 according to the system described herein may be gathered by the component according to the data collection techniques discussed elsewhere herein. Reference is made, for example, to U.S. patent application Ser. No. 13/335,316 to Lim et al., filed Dec. 22, 2011, and entitled "Path Performance Data Collection," which is incorporated herein by reference, that discloses controlled tuning performance data collection provided through a single application controller of a path performance data collection tool and may be used in connection with the system described herein. The performance data collection may be turned on or off from the application host running the tool via a user interface. Lim's tool may automatically (e.g., without user intervention) update performance data collection characteristics as the application host I/O data path changes according to user controlled settings but without requiring further user intervention during the updating. Turning on path performance data collection on the application host via the user interface may automatically set up synchronized performance data collection for all managed objects within an I/O data path.

In various embodiments, data used in connection with the system described herein may obtained using other data collection devices and mechanisms, including products produced by EMC Corporation such as the EMC Workload Analyzer (WLA), the Symmetrix Performance Analyzer (SPA)®, the Symmetrix CLI statistics collection daemon (STP), the Storage Configuration Advisor (SCA) and/or the ProSphere Discovery Engine, among other possible collection devices, applications and/or appliances. Reference is made, for example, to U.S. Pat. No. 6,622,221 to Zahavi, entitled "Workload Analyzer and Optimizer Integration," which is incorporated herein by reference and which discloses techniques used in connection with evaluating the performance of proposed device swap plans in accordance with past performance data collected.

Figure 9:
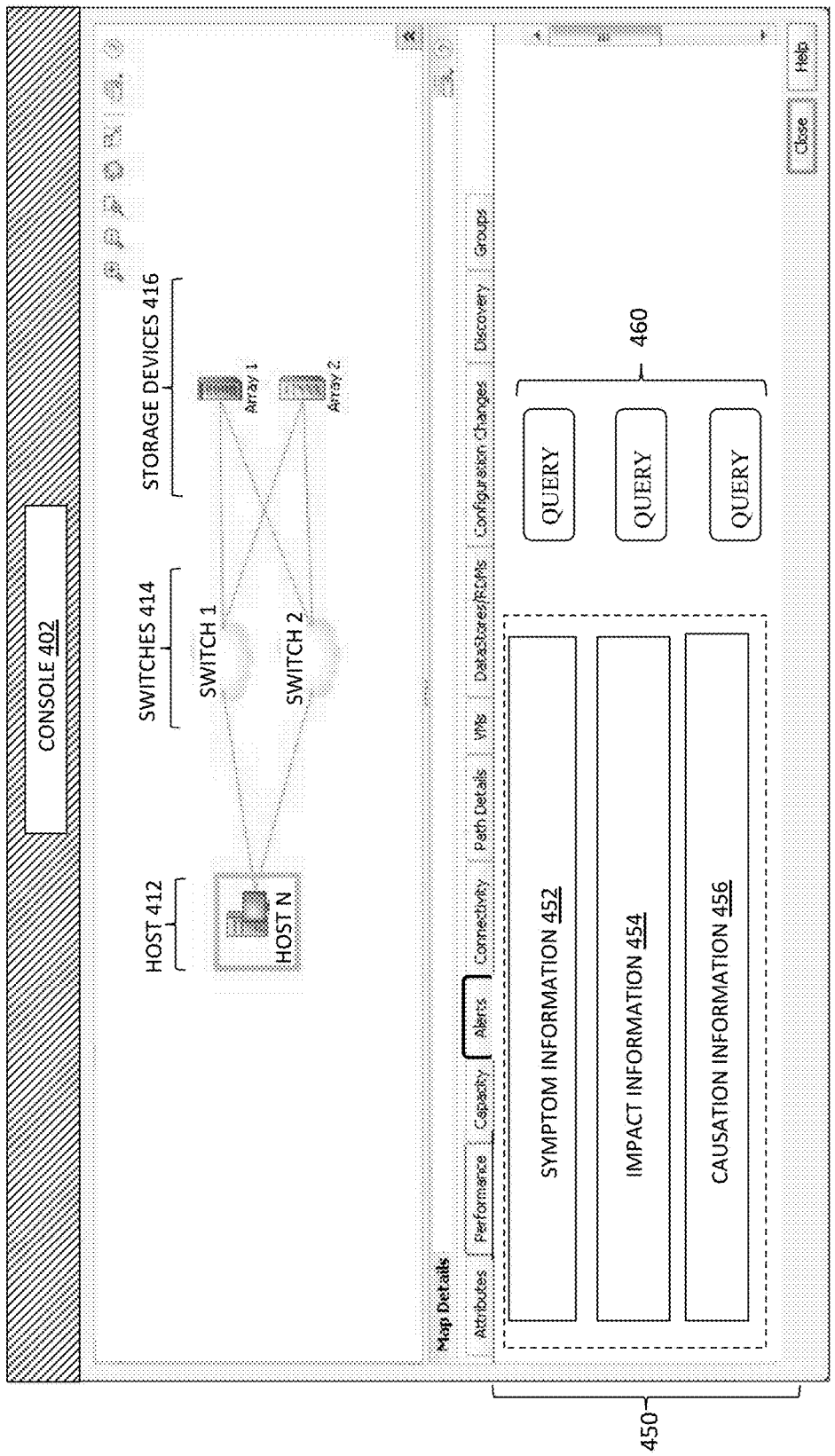
FIG. 9 is a schematic illustration showing another console screen of the controller in which alert relationships for a SAN are illustrated according to an embodiment of the system described herein

FIG. 9 is a schematic illustration showing another console screen (console 402) of the controller 400, having a similar topology display as that of the console 401 but in which alert relationships for the network are illustrated in section 450 of the console 402 according to an embodiment of the system described herein. The section 450 shows alert relationship information determined on-the-fly according to the system described herein and including symptom information 452, impact information 454 and causation information 456, including root causes, in connection with one or more alerts. For a given alert, according to the system described herein, only immediate relationships may be maintained as alert attributes information. For example, for the case where an alert "A" is a root cause, alerts "B" and "C" are intermediate symptoms and alerts "I1" and "I2" are impacts, a user who receives alert C will have the following information:

a) C is caused by alert B; and
b) C impacts I1.

According to the system described herein, if the user wants to obtain further information concerning the alert C, the user may request further information, for example, using one or more query buttons 460 and/or other appropriate query mechanism submitted via the controller 400. In an embodiment, the user may query the controller 400 to determine the "RootCausedBy" information for the alert C and determine, by traversal of an alert relationship path as further discussed elsewhere herein, that alert A is the root cause of alert C and obtain alert A's properties. It is noted that there is a possibility that alert C is caused by multiple alerts, in which case the controller 300 may traverse all possible alert relationship paths, as further discussed elsewhere herein, and determine all root cause alerts of C. A similar algorithm may be applied in a different direction, for example, to determine impact alerts caused by alert C.

TABLE 1, below, shows alert relationship information that may be obtained by the controller 400 based on processing according to the system described herein for a use case example in which: A causes B. B causes C. C impacts I1 and A impacts I2.

TABLE 1

Alert Relationship Information

A:: Causes B, I2
A:: CausedBy <Empty>
A:: RootCaused by <Empty>
A:: Impacts I1, I2
B:: Causes C
B:: CausedBy A
B:: RootCausedBy A
B:: Impacts I1
C:: Causes I1
C:: CausedBy B
C:: RootCausedBy A
C:: Impacts I1
I1:: Causes <Empty>
I1:: CausedBy C
I1: : RootCausedBy A
I1:: Impacts <Empty>
I2:: Causes <Empty>
I2:: CausedBy A
I2:: RootCausedBy A
I2:: Impacts <Empty>

Figure 10:
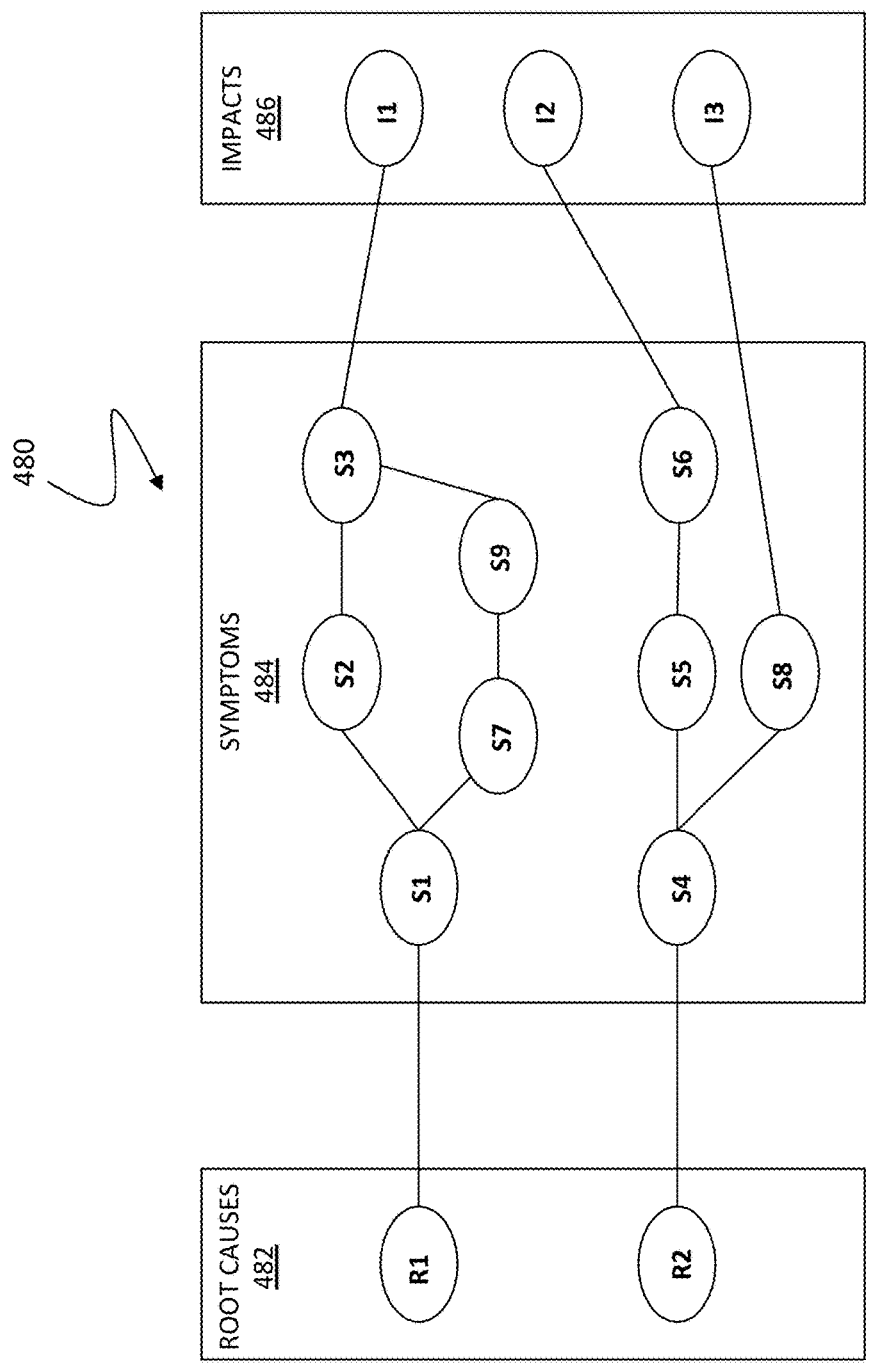
FIG. 10 is a schematic illustration showing an example alert relationship tree with paths that may be traversed according to processing by the controller to determine alert relationships on-the-fly between root causes, symptoms and impacts according to an embodiment of the system described herein.

FIG. 10 is a schematic illustration showing an example alert relationship tree 480 with paths that may be traversed according to processing by the controller 400 (see FIGS. 8 and 9) to determine alert relationships on-the-fly between root causes 482, symptoms 484 and impacts 486 according to an embodiment of the system described herein. For example, a user may receive and view alert S3 of the tree 480 and desire to know the Root Cause alert of the alert S3.

From S3, from the immediate relationships thereof that are maintained, the controller 400 determines that S3 is caused by alerts S9 and S2. Processing of the controller 400 may then include pushing S2 onto a stack and/or other appropriate software structure and traversing the tree beginning from node S9: specifically, S9, S7, S1 and R1. In the tree traversal, the controller 400 may determine from each alert reached the immediate relationships of that alert in order to continue traversing a particular path of the tree 480. The traversing of paths in the tree 480 may be automatic and provide for automated root cause and impact analyses in accordance with the features of the system discussed herein.

In the above-noted example, the controller 400 determines that R1 is a root cause alert of alert S3 and may store this information in a list, e.g., a RootCauseList. The controller may then pop alert S2 from the stack, and traverse a path through tree 480 beginning with node S2. In this example, the controller 400 will traverse S2 back through S1 to R1 to determine that R1 is the root cause via the S2 path. The controller 400 may determine from the RootCauseList that R1 has already been determined as a root cause for the alert S3. If the controller 400 determines that there are no further alerts from the stack to be traversed, the controller may then return to the requesting user the RootCauseList alerts for S3; specifically, return that R1 is the root cause alert for alert S3. It is noted that a similar algorithm as that noted above may be applied in reverse to determine impact alerts caused by a particular alert. For example, for a received alert S4, for which the user desires to know impact alerts caused thereby, the controller 400 may traverse the tree 480 in a manner similar to that noted discussed above but in a different direction (e.g., paths beginning with alerts S5 and S8, respectively) to determine that impact alerts I2 and I3 (e.g., which may be stored in an ImpactCausedList) are caused by the alert S4.

Figure 11:
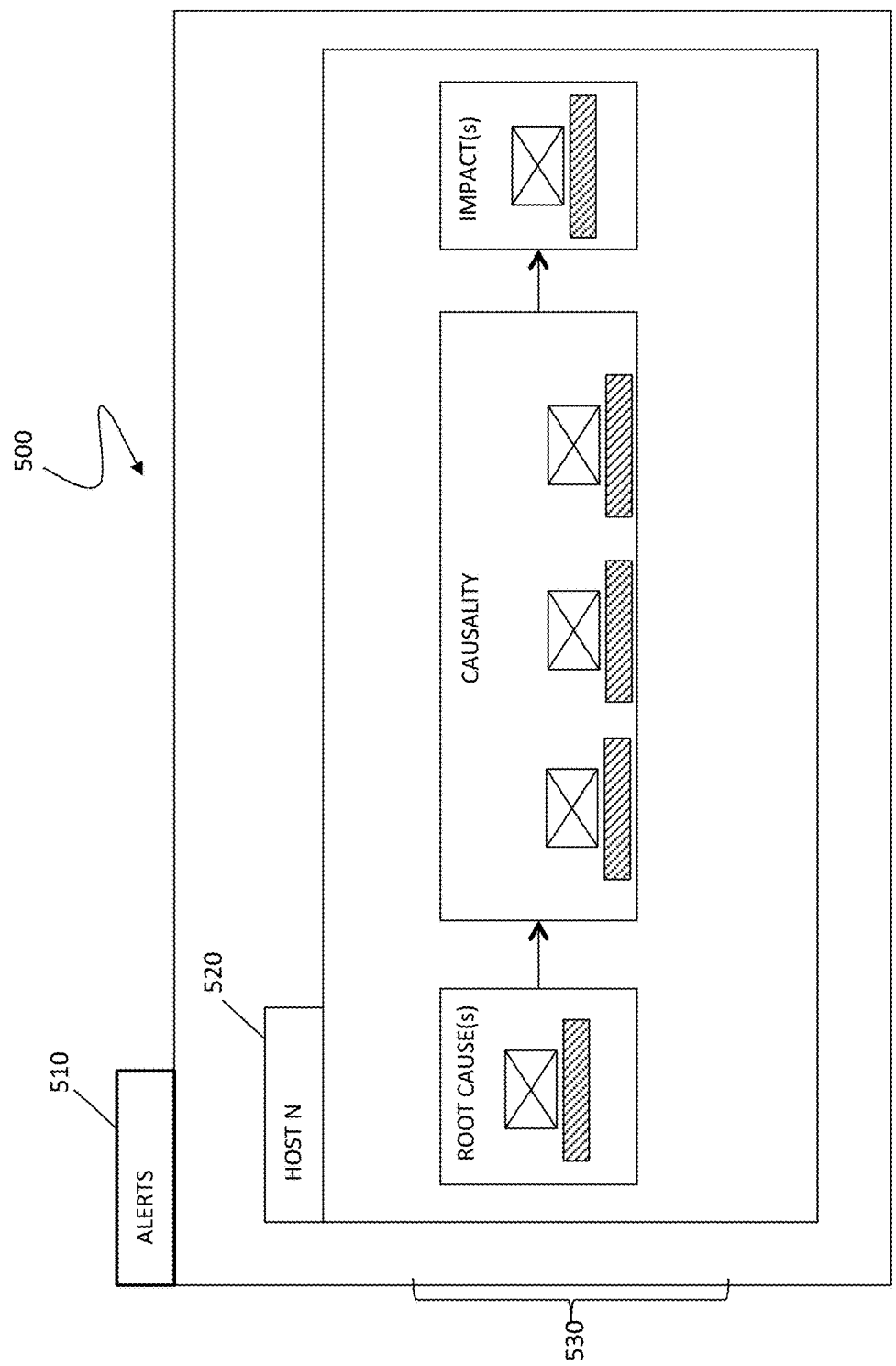
FIG. 11 is a schematic illustration showing a causality map that may be displayed for the user in response to a query submitted to the controller according to an embodiment of the system described herein.

FIG. 11 is a schematic illustration showing a causality map 500 that may be displayed for the user in response to a query submitted to the controller 400 according to an embodiment of the system described herein. The causality map 500 may be a display screen of the controller 500 showing determinations of alerts 510 as queried by a user. The alerts 510 may be shown in a topology view in connection with SAN alert information corresponding to one of more hosts (e.g., HOST N 520). A map overview section 530 of the causality map 500 may provide a visual topology of root cause(s), symptom causality and impact(s) for the one or more hosts, as determined according to processing like that discussed elsewhere herein.

Figure 12:
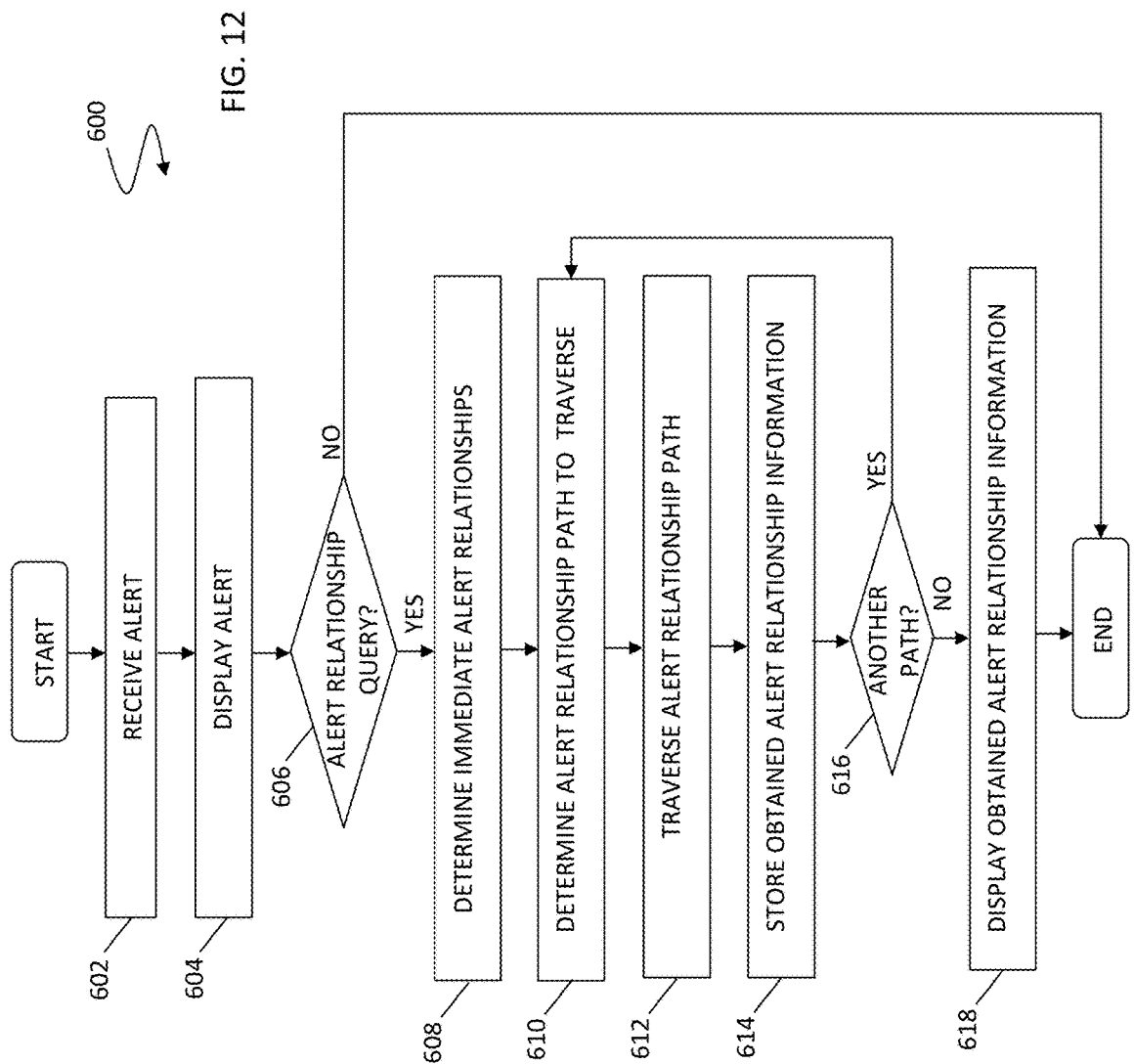
FIG. 12 is a flow diagram showing processing for on-the-fly alert relationship determinations according to an embodiment of the system described herein.

FIG. 12 is a flow diagram 600 showing processing for on-the-fly alert relationship determinations according to an embodiment of the system described herein. At a step 602, an alert is received that may, for example, alert a user to the occurrence of a particular error symptom occurring on the SAN. After the step 602, processing proceeds to a step 604 where the alert is displayed on an interface of a controller. After the step 604, processing proceeds to a test step 606 where it is determined whether a user has requested alert relationship information corresponding to the received alert, for example, the user by activating a query using the interface. In various embodiments, the alert relationship information queries may include requests for one or more root causes of the alert and/or impacts of the alert. If, at the test step 606, it is determined that the user has made no query request for further alert relationship information, then processing is complete. If, at the test step 606, it is determined that the user has requested alert relationship information then processing proceeds to a step 608 where immediate relationships of the alert are determined. For example, the immediate relationships may include the directly preceding cause of the alert and/or the directly subsequent cause/impact of the alert.

After the step 608, processing proceeds to a step 610 where an alert relationship path is determined for traversal. For example, to determine a root cause of a received alert, the beginning of the traversal path will be an immediately preceding cause of the received alert. In the case where there are more than one preceding causes, all but one of the causes will be temporarily suspended (e.g., pushed onto a stack and/or other software structure for later retrieval) and the remaining cause will indicate the beginning of the path for traversal. A similar but reverse process may be used for obtaining a desired impact of a received alert. After the step 610, processing proceeds to a step 612 where the selected alert relationship path is traversed. After the step 612, processing proceeds to a step 614 where desired alert relationship information (e.g., root cause or impact) is obtained and stored.

After the step 614, processing proceeds to a test step 616 where it is determined if another path exists for received alert. For example, if the received alert was caused by two different alerts, and a first one of the causality alerts was initially used to establish the path for traversal, then the second of the causality alerts may be used to establish another path. Accordingly, if, at the test step 616, it is determined that another path exists then processing proceeds back to the step 610 to determine the (next) alert relationship path for traversal. For example, the next causality alert may be popped from the software stack where it has been temporarily stored. If, at the test step 616, it is determined that another path does not exist for the received alert, then processing proceeds to a step 618 where the obtained and stored alert relationship information is displayed using a console of a controller, for example, responsive to a user's query. After the step 618, processing is complete.

A codebook is a mechanism that may be used to correlate symptoms to causes of a problem or fault in a system, such as a cloud computing system, using codes corresponding to the observed symptoms that are generated and stored in the codebook. The codebook may be generated from a causality map and/or matrix of alerts as further discussed elsewhere herein and may be computer readable. For further details of known systems and techniques for codebook generation and uses thereof in system fault identification, reference is made, for example, to U.S. Pat. No. 7,003,433 to Yemini et al., U.S. Pat. No. 6,965,845 to Ohsie et al., and U.S. Pat. No. 5,528,516 to Yemini et al. which are further discussed elsewhere herein and which are incorporated herein by reference.

An adaptive fault identification system may be used to identify the root cause of a fault by discovering the problem domain corresponding to a set of observable symptoms. The problem domain may be discovered at runtime by identifying objects that are directly or indirectly impacted by symptoms of a fault and the root cause of the fault may be determined within the problem domain. By dynamically computing a causality map or matrix of alerts and correlating the codebook at runtime there is no need to maintain the codebook in memory and the codebook may adapt to changes in system topology as such changes occur. Additionally, by correlating the codebook for a limited problem domain, instead of an entire system repository of alerts, computation time of the codebook may be significantly reduced. Such a system for scalable codebook correlation for cloud scale topology may be scalable to large scale cloud system topologies that may be continually growing and changing. Reference is made, for example, to U.S. patent application Ser. No. 13/561,340 to Jain et al., filed Jul. 30, 2012, and entitled "Scalable Codebook Correlation for Cloud Scale Topology," which is incorporated herein by reference.

In accordance with an embodiment of the system described herein, a system and algorithm to map alerts to a problem domain is provided so that the size of the codebook for the problem domain may be reduced and correlated independently of the general system and/or other problem domains in the system topology. When one or more symptoms of a fault appear in the system topology, the problem domain is discovered dynamically and the codebook for the problem domain generated dynamically. The system described herein provides for computation of a problem domain that has a reduced object repository for a set of objects which are directly or indirectly impacted by monitored alerts. Each problem domain may independently build the codebook. In an embodiment, the system described herein may operate using supervisor symptoms that are symptoms which have the highest probability of occurrence corresponding to a fault in the system topology. When these symptoms transition their state (e.g., inactive to active or active to inactive), the symptoms may be pushed to a queue, as further discussed elsewhere herein.

Figure 13A:
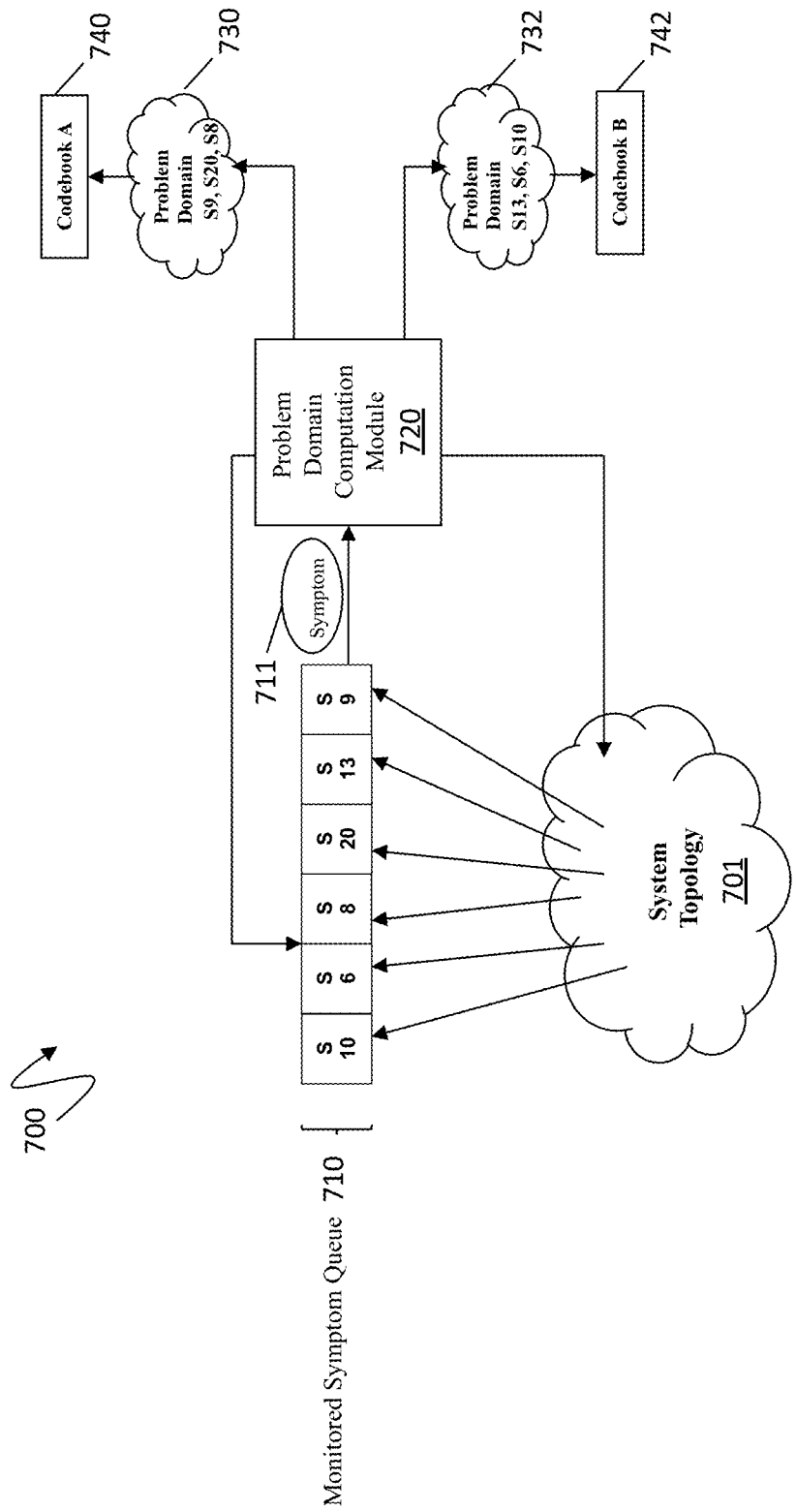
FIG. 13A is a schematic illustration showing elements of an adaptive fault identification system that may be based on a map and reduce model according to an embodiment of the system described herein.

FIG. 13A is a schematic illustration showing elements of an adaptive fault identification system 700 that may be based on a map and reduce model according to an embodiment of the system described herein. In a system topology 701, for example, a cloud computing system and/or other distributed system, whenever one or more supervisor symptoms transition between states (e.g., inactive to active or active to inactive), the one or more supervisor symptom alerts is pushed to a monitored symptom queue 710. The queue 710 may be periodically polled by a problem domain computation module 720. The problem domain computation module 720 retrieves a symptom alert 711 from the front or top of the queue 710 and computes a problem domain 730 corresponding to the retrieved symptom alert. The problem domain 730 is computed dynamically by mapping the identified symptom alert 711 on an object repository of the system topology 701 and recursively finding the neighboring objects with active supervisory symptoms. In an embodiment, computation of the problem domain 730 may include traversing an alert relationship tree to identify a path of symptoms and affected objects impacted as further discussed elsewhere herein. The algorithm of computing the problem domain is further discussed elsewhere herein.

After the problem domain 730 has been computed, a codebook 740 (Codebook A) for the problem domain 730 may be computed and correlated according to the system described herein. As shown in the figure, the system described herein enables multiple problem domains 730, 732 to be independently determined in parallel and multiple codebooks A, B 740, 742 to be computed and correlated. It is noted that, in various embodiments, the codebooks may be maintained separately and/or may be combined into one codebook.

Figure 13B:
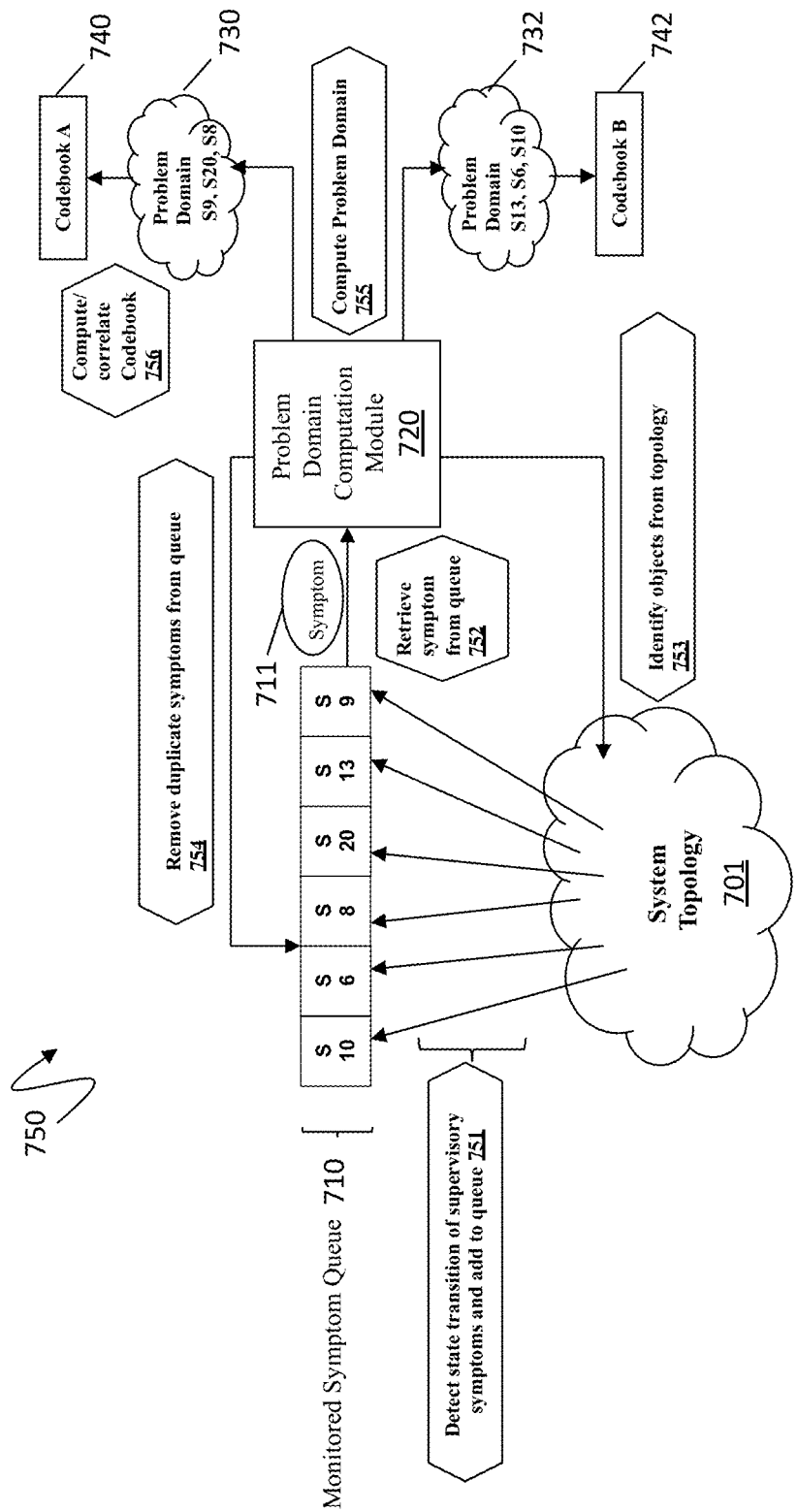
FIG. 13B is a schematic illustration showing data flow processes performed in connection the adaptive fault identification system shown in FIG. 13A.

FIG. 13B is a schematic illustration 750 showing data flow processes performed in connection the adaptive fault identification system 700 shown in FIG. 13A. A data flow process 751 provides for detecting state transition of supervisory symptoms in the system topology 701 and adding the supervisory symptom alerts to the monitored symptom queue 710. A data flow process 752 provides for retrieval by the problem domain computation module 720 of a symptom from the monitored symptom queue 730. A data flow process 753 provides for identifying impacted objects from the system topology 701. A data flow process 754 provides for eliminating duplicate symptom alerts from the monitored symptom queue 730. A data flow process 755 provides for computing the problem domain that is determined for the impacted objects. A data flow process 756 provides for computing and correlating a codebook for the determined problem domain.

As the problem domain could be very small in comparison to the repository of the entire system topology, the time taken to compute and correlate the codebook for the problem domain is considerably and advantageously reduced. As the problem domain includes the history of previous problems and the impacted objects, it is not required that the codebook be stored in-memory. In this way, several dynamic codebooks may be run simultaneously without losing any information for accurate root cause analysis. The system described herein is advantageously cloud ready and is scalable for a cloud scale topology of increasing complexity.

FIG. 14 is a flow diagram 800 for processing of the problem domain computation module according to an embodiment of the system described herein. At a step 802, a problem domain is initialized. After the step 802, processing proceeds to a step 804 where a symptom alert is retrieved from a symptom queue. After the step 804, processing proceeds to a step 806 where the object, at which the symptom is observed, is identified. After the step 806, processing proceeds to a step 808 where other alert relationships corresponding to the identified symptom are identified. In an embodiment, the other alert relationships may be identified using an alert relationship tree and algorithm and causality map or matrix computation, as further discussed elsewhere herein, and may include related symptoms, impacts and/or causes.

After the step 808, processing proceeds to a step 810 where all of the objects from the system topology corresponding to the related symptoms, impacts and/or causes are identified. After the step 810, processing proceeds to a step 812 where the problem domain is defined using the objects corresponding to the identified supervisor symptom and the related symptoms, impacts and/or causes. After the step 812, processing proceeds to a step 814 where duplicate alerts, and/or any duplicate objects caused thereby, are eliminated from the monitored symptom queue. After the step 814, processing proceeds to a step 816 where a codebook is computed and correlated for the defined problem domain. It is noted that multiple iterations of the above-noted steps may be performed independently and in parallel for multiple problem domains. After the step 816, processing is complete.

In a virtual environment deployment, such as in a virtualization using VPLEX, applications may transparently share and balance resources between geographically distributed data centers, as further discussed elsewhere herein. In distributed data centers, path performance may be a cause of unsatisfactory performance of applications. Often data transfers on WAN link between the VPLEX clusters experience the degraded performance. Since network resources are globally distributed, across organizational and management boundaries, it can be difficult to locate and identify the factors that are causing the performance degradation. Detailed insight into the health of complete end-to-end network paths, between the VPLEX clusters (source-to-destination) including hops, would provide for smooth operation of VPLEX cluster. In connection with the system described herein, an infrastructure management suite may be used that has the capability to manage end-to-end IT infrastructure. One example of an infrastructure management suite is provided by an EMC product, such as EMC Smarts Codebook Correlation (also referred to as EMC Ionix Codebook Correlation). A Smarts codebook correlation engine can monitor the performance characteristics of a core network and correlate the faults and performance issues between VPLEX clusters/Infrastructure.

According to the system described herein, a system and method are provided to model a network path with performance characterization for individual path segments of the network path and correlate the faults and performance issues to identify the factors that are causing network path performance degradation. The system described herein provides for codebook correlation technology to identify the root cause of network path performance degradation. Advantageously, the system described herein provides proactive cause analysis of network path problems, correlates the performance characteristics of participating hops, and provides an insight of real problems in network paths.

In an embodiment, an algorithm is provided to model the network path with performance characterization and analysis. A network path is a sequence of ordered path segments (hops). The performance of a network path is determined by performance characteristics of individual hops along the network path. The path performance of the network path may then be characterized with weighted attributes indicative of performance, such as round trip time (RTT), delay, jitter and drop percentage, over individual hops along the network path. The individual hops along the network path may be modeled with weighted attributes indicative of performance such as drop rate, error rate, incoming packet/outgoing packet rate etc. These symptoms may be aggregated to provide the path performance using codebook correlation to perform a causal analysis.

In an embodiment of the algorithm, the network path may be modeled as an entity with two endpoints, Start node and End node, and composed of set of path segments (hops). Then, path performance characteristics (e.g., RTT, delay, jitter, class of service (CoS) etc.) may be measured and instrumented (e.g., by an RTTMon probe). The network path may have a casualty matrix corresponding to summarization of performance symptoms of sequential path segments. This causality matrix identifies the root cause of one or more of network path problems.

An example of a Common Information Model (CIM) model for a network path is provided in the following Table 2:

TABLE 2

CIM model for NetworkPath

NetworkPath {
    //End points
    StartNode,
    EndNode,
    //Set of path segments (hops)
    Ordered Set of PathSegment {PS1,PS2, ......., PSN},
    //Path performance characteristics
    RoundTripTime,
    PacketLossPercentage,
    Jitter,
    ClassOfService,
    // Path performance measurement probe
    NetworkPathInstrumentedBy{
            pathRmonProbe
    }
    //Path performance problem
    CausalitySymptom{

TABLE 2-continued

CIM model for NetworkPath

Problem:PathPerformanceDegraded=
            (RTTAvg > permissbleRountTripTime |
            PacketLossPercentage >
            permissblePacketLoss | Jitter >
            permissbleJitter)
    }
    //Path performance causality matrix - summarized
    causality of sequential path segments
    CauseBy{
            CausePathPerformance = $\Sigma_{PS1}^{PSN}$ PathSegment-
            Performance
    }
};

An example of a CIM model for a path segment is provided in the following Table 3:

TABLE 3

CIM model for PathSegment

Figure 15:
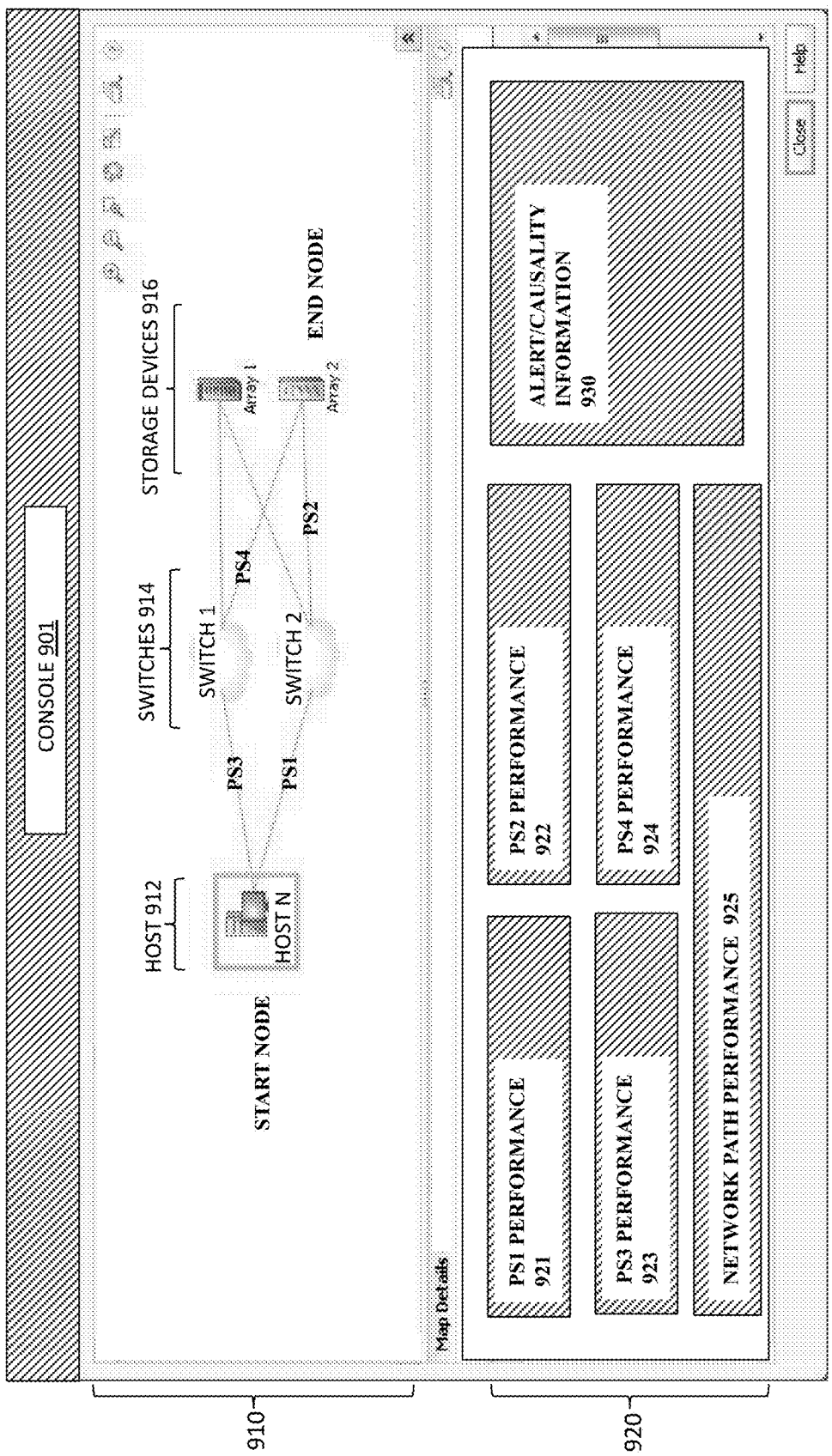
FIG. 15 is a schematic illustration showing a controller according to an embodiment of the system described herein that may include a console that enables feature control and display for network performance management using codebook correlation.

PathSegment{
    //Incoming-outgoing ports
    IngressInterface
    EgressInterface
    //Incoming-outgoing packet rates
    IncomingPacketRate
    OutgoingPacketRate
    //Percentage bandwidth utilization
    PercentageUtilization
    //Error rates
    ErrorPacketRate
    DropPacketRate
    // Path segment measurement probe
            Path SegmentInstrumentedBy{
                    InterfaceAdaptorProbe
            }
    //Path segment causality matrix
    CausalitySymptom{
            Symptom:: PathSegmentPerformance=
                    (HighUtilization |
                    HighErrorRate | HighDropRate)
    }
};

FIG. 15 is a schematic illustration showing a controller 900 according to an embodiment of the system described herein that may include a console 901 that enables feature control and display for network performance management using codebook correlation. The controller 900 may provide for user interface control and/or display of aspects of the network and components thereof, including performance characteristics and alert relationship analyses, according to various embodiments of the system described herein. In the illustrated example, the console 901 of the controller 900 is shown displaying a SAN and/or other appropriate network topology corresponding to one or more I/O paths for a HOST N of the network. The console 901 may include a graphical section 910 that shows a visual topology representation of the network and components thereof. For example, the section 910 graphical displays the host 912 (HOST N), coupled via switches 914, to one or more storage devices/arrays 916.

In accordance with the system described herein, a network path from a Start Note to an End Note is identified, as shown, for example, in the figure, from Host N 912 to Array 2 of the arrays 916. Multiple path segments (PS1, PS2, PS3, PS4) (hops) are identified for segments of the identified network path. Section 920 may display map details of the identified path segments (PS1-4) of the network path including collection and display of performance characteristics 921-924 measured for individual path segments and performance characteristics measured for the whole network path 925. As further discussed elsewhere herein, various tools and applications may be used to collect and measure the performance characteristics of the network path and the individual path segments. The performance characteristics measured and displayed for the network path may include those discussed elsewhere herein, such as round trip time (RTT), delay, jitter and drop percentage, over individual path segments (PS1-4) along the network path. The individual path segments along the network path may be modeled with weighted attributes indicative of performance such as drop rate, error rate, incoming packet/outgoing packet rate etc.

The controller 900 according to the system described herein may provide for analysis and display of alerts and causality information 930 for the network path and the individual path segments. For example, the information 930 may present a causality map or matrix that summarizes problem performance symptoms for each of the path segments and that identifies one or more root causes of symptoms, as described in detail elsewhere herein. The causality map or matrix of the performance symptoms for the network path and each of the path segments may then be correlated using one or more codebooks, as further discussed elsewhere herein. By enabling codebook correlation for particular path segments, the system described herein may provide for a more specific and efficient identification of problem path segments of the network path. Additionally, by correlating the codebook for a limited problem domain, e.g., identified path segments, instead of an entire system repository of alerts, computation time of the codebook may be significantly reduced. Based on the codebook correlation for individual path segments (hops), more optimal and/or efficient path segments may be determined and used in connection with the network path between the determined start node and end node.

In various embodiments, the controller 900 may be an application installed on an application host or other computer providing network administration and/or management functionality and/or may be installed on one or more of hosts coupled to the network. In an embodiment, the controller 900 may be used in connection with one or more Ionix produced by EMC Corporation of Hopkinton, Mass. Other storage management products that may be used in connection with the system described herein may include, for example, EMC's ProSphere product and/or a Vblock platform product produced by VCE Company, LLC.

FIG. 16 is a flow diagram 1000 showing processing for network path performance management using codebook correlation according to an embodiment of the system described herein. At a step 1002, a network path of interest is identified, for which end points (e.g. start and end nodes) of the network path are determined. After the step 1002, processing proceeds to a step 1004 where path segments of the network path are determined. The network path and path segments may be identified and determined using one or more models, as further discussed elsewhere herein. After the step 1004, processing proceeds to a step 1006 where performance characteristic measurements are made for the network path and the path segments. The performance characteristics measured for the network path may include, for example, RTT, packet loss percentage, jitter and/or CoS, among other appropriate performance characteristics, and the performance characteristics measured for the individual path segments may include drop rate, error rate, incoming packet/outgoing packet rate, percentage utilization, among other appropriate performance characteristics.

After the step 1006, processing proceeds to a step 1008 where a causality map or matrix is determined based on the performance characteristics measured for the network path and the path segments. After the step 1008, processing proceeds to a step 1010 where the causality map or matrix for the network path and the path segments is correlated with one or more codebooks and which may be used to analyze network path performance problems and determine more optimal and/or efficient path segments for the network path. After the step 1010, processing is complete for the described iteration of the processing.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for network path performance management, comprising:
  modeling a network path, including start and end nodes and a plurality of path segments of the network path, as a common set of objects and relationships between the objects;
  receiving a plurality of specific symptom alerts in response to state transitions of the objects;
  determining a limited problem domain based on the specific symptom alerts and the plurality of path segments that are modeled with weighted attributes indicative of at least one of: drop rate, error rate, incoming packet rate and outgoing packet rate, wherein the limited problem domain is less than an entire system repository of alerts;
  generating a specific codebook based on the limited problem domain;
  measuring at least one path performance characteristic for the modeled network path and at least one segment performance characteristic for each of the modeled plurality of path segments;

determining causality information based on the performance characteristics measured for the modeled network path and each of the modeled plurality of path segments; and correlating the causality information using the specific codebook to identify at least one network path performance problem.

2. The method according to claim 1, wherein the at least one network path performance problem includes at least one root cause of a performance symptom.

3. The method according to claim 1, further comprising: modifying the modeled network path to include a different one of the modeled plurality of path segments based on the identified at least one network path performance problem.

4. The method according to claim 1, wherein the at least one path performance characteristic includes at least one of: round trip time, packet loss percentage, jitter or class of service.

5. The method according to claim 1, wherein the at least one segment performance characteristic includes at least one of: incoming packet rate, outgoing packet rate, percentage bandwidth utilization, error packet rate or drop packet rate.

6. The method according to claim 1, further comprising: displaying information corresponding to the identified at least one network path performance problem according to individual ones of the modeled plurality of path segments.

7. The method according to claim 1, further comprising determining weighted performance attributes for the modeled network path or one of the modeled plurality of path segments.

8. A non-transitory computer-readable medium storing software for network path performance management, comprising:

executable code that models a network path, including start and end nodes and a plurality of path segments of the network path, as a common set of objects and relationships between the objects;

executable code that receives a plurality of specific symptom alerts in response to state transitions of the objects;

executable code that determines a limited problem domain based on the specific symptom alerts and the plurality of path segments that are modeled with weighted attributes indicative of at least one of: drop rate, error rate, incoming packet rate and outgoing packet rate, wherein the limited problem domain is less than an entire system repository of alerts;

executable code that generates a specific codebook based on the limited problem domain;

executable code that measures at least one path performance characteristic for the modeled network path and at least one segment performance characteristic for each of the modeled plurality of path segments;

executable code that determines causality information based on the performance characteristics measured for the modeled network path and each of the modeled plurality of path segments; and executable code that correlates the causality information using the specific codebook to identify at least one network path performance problem.

9. The non-transitory computer-readable medium according to claim 8, wherein the at least one network path performance problem includes at least one root cause of a performance symptom.

10. The non-transitory computer-readable medium according to claim 8, wherein the software further comprises:

executable code that modifies the modeled network path to include a different one of the modeled plurality of path segments based on the identified at least one network path performance problem.

11. The non-transitory computer-readable medium according to claim 8, wherein the at least one path performance characteristic includes at least one of: round trip time, packet loss percentage, jitter or class of service.

12. The non-transitory computer-readable medium according to claim 8, wherein the at least one segment performance characteristic includes at least one of: incoming packet rate, outgoing packet rate, percentage bandwidth utilization, error packet rate or drop packet rate.

13. The non-transitory computer-readable medium according to claim 8, wherein the software further comprises:

executable code that displays information corresponding to the identified at least one network path performance problem according to individual ones of the modeled plurality of path segments.

14. The non-transitory computer-readable medium according to claim 8, further comprising executable code that determines weighted performance attributes for the modeled network path or one of the modeled plurality of path segments.

15. A system for managing network path performance, comprising:

a controller that identifies components of a network path;

at least one processor that executes software stored on a non-transitory computer-readable medium, the software including:

executable code that models a network path, including start and end nodes and a plurality of path segments of the network path, as a common set of objects and relationships between the objects;

executable code that receives a plurality of specific symptom alerts in response to state transitions of the objects;

executable code that determines a limited problem domain based on the specific symptom alerts and the plurality of path segments that are modeled with weighted attributes indicative of at least one of: drop rate, error rate, incoming packet rate and outgoing packet rate, wherein the limited problem domain is less than an entire system repository of alerts;

executable code that generates a specific codebook based on the limited problem domain;

executable code that measures at least one path performance characteristic for the modeled network path and at least one segment performance characteristic for each of the modeled plurality of path segments;

executable code that determines causality information based on the performance characteristics measured for the modeled network path and each of the modeled plurality of path segments; and executable code that correlates the causality information using the specific codebook to identify at least one network path performance problem.

16. The system according to claim 15, wherein the at least one network path performance problem includes at least one root cause of a performance symptom.

17. The system according to claim 15, wherein the software further comprises:

executable code that modifies the modeled network path to include a different one of the modeled plurality of path segments based on the identified at least one network path performance problem.

18. The system according to claim 15, wherein the at least one path performance characteristic includes at least one of: round trip time, packet loss percentage, jitter or class of service, and wherein the at least one segment performance characteristic includes at least one of: incoming packet rate, outgoing packet rate, percentage bandwidth utilization, error packet rate or drop packet rate.

19. The system according to claim 15, further comprising:
a display, and wherein the software further comprises executable code that displays information corresponding to the identified at least one network path performance problem according to individual ones of the modeled plurality of path segments.

20. The system according to claim 15, wherein the software further comprises executable code that determines weighted performance attributes for the modeled network path or one of the modeled plurality of path segments.

* * * * *